United States Patent
Du et al.

(10) Patent No.: US 10,158,930 B2
(45) Date of Patent: Dec. 18, 2018

(54) UPGRADING PON SYSTEMS USING A MULTI-CYCLE FIELD AWG

(71) Applicant: Google Inc., Mountain View, CA (US)

(72) Inventors: Liang Du, Santa Clara, CA (US);
Xiangjun Zhao, Fremont, CA (US);
Cedric Fung Lam, San Carlos, CA (US); Daoyi Wang, San Jose, CA (US);
Changhong Joy Jiang, Dublin, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/637,939

(22) Filed: Jun. 29, 2017

(65) Prior Publication Data
US 2017/0332159 A1    Nov. 16, 2017

Related U.S. Application Data

(63) Continuation of application No. 14/952,321, filed on Nov. 25, 2015, now Pat. No. 9,729,950.

(51) Int. Cl.
*H04B 10/00* (2013.01)
*H04Q 11/00* (2006.01)
(Continued)

(52) U.S. Cl.
CPC ...... *H04Q 11/0067* (2013.01); *H04J 14/0241* (2013.01); *H04L 69/18* (2013.01);
(Continued)

(58) Field of Classification Search
USPC ...................................... 398/66–73
See application file for complete search history.

(56) References Cited

U.S. PATENT DOCUMENTS

| 7,450,848 | B2* | 11/2008 | Li | ............... | H04J 14/02 |
| | | | | | 398/68 |
| 8,457,165 | B2* | 6/2013 | Liu | ............... | H01S 5/06256 |
| | | | | | 372/102 |

(Continued)

FOREIGN PATENT DOCUMENTS

| WO | WO-2007074979 A1 | 7/2007 |
| WO | WO-2015044036 A1 | 4/2015 |

(Continued)

OTHER PUBLICATIONS

International Search Report and Written Opinion for Application No. PCT/US2016/061074 dated Feb. 7, 2017.
(Continued)

*Primary Examiner* — Agustin Bello
(74) *Attorney, Agent, or Firm* — Honigman Miller Schwartz and Cohn LLP

(57) ABSTRACT

The communication system has first and second optical systems and an optical feed fiber in communication with the first optical system and arranged to convey a feeder optical signal to the second optical system. The first optical system includes a multiplexer configured to multiplex/demultiplex between a first optical line terminal signal, a second optical line terminal signal, and the feeder optical signal. The feeder optical signal includes the first optical line terminal signal and the second optical line terminal signal. The first optical line terminal signal includes a first upstream free spectral range and a first downstream free spectral range. The second optical line terminal signal includes a second upstream free spectral range and a second downstream free spectral range. The second optical system is in communication with the optical feed fiber and is configured to multiplex and demultiplex between the feeder optical signal and optical network unit signals.

24 Claims, 18 Drawing Sheets

(51) Int. Cl.
*H04J 14/02* (2006.01)
*H04L 29/06* (2006.01)

(52) U.S. Cl.
CPC . *H04Q 11/0005* (2013.01); *H04Q 2011/0016* (2013.01); *H04Q 2011/0032* (2013.01); *H04Q 2011/0079* (2013.01)

(56) References Cited

U.S. PATENT DOCUMENTS

| | | | | |
|---|---|---|---|---|
| 8,818,200 | B2* | 8/2014 | Lee | H04J 14/0226 398/140 |
| 8,855,492 | B2* | 10/2014 | Hood | H04J 14/0234 398/66 |
| 8,953,942 | B1* | 2/2015 | Lam | H04J 14/0282 398/68 |
| 2006/0104638 | A1* | 5/2006 | Chung | H04J 14/0226 398/71 |
| 2007/0212072 | A1* | 9/2007 | Iannone | H04J 14/0226 398/72 |
| 2007/0274729 | A1* | 11/2007 | Lee | H04B 10/506 398/153 |
| 2008/0019693 | A1* | 1/2008 | Sorin | H04Q 11/0067 398/71 |
| 2009/0162065 | A1* | 6/2009 | Mizutani | H04J 3/0655 398/66 |
| 2010/0046945 | A1* | 2/2010 | Lee | H04J 14/0226 398/68 |
| 2012/0128360 | A1* | 5/2012 | Lee | H04J 14/0239 398/72 |
| 2012/0224850 | A1* | 9/2012 | Cavaliere | H04J 14/00 398/34 |
| 2012/0269516 | A1 | 10/2012 | Liu et al. | |
| 2012/0315040 | A1* | 12/2012 | Dahlfort | H04J 14/0246 398/58 |
| 2013/0136447 | A1* | 5/2013 | Cavaliere | H04J 14/0282 398/49 |
| 2013/0183039 | A1* | 7/2013 | Hood | H04J 14/0234 398/72 |
| 2014/0161446 | A1 | 6/2014 | Lee et al. | |
| 2014/0294391 | A1* | 10/2014 | Tamaki | H04L 12/12 398/68 |
| 2014/0314414 | A1* | 10/2014 | Cheng | H04J 14/02 398/68 |
| 2014/0341579 | A1* | 11/2014 | Effenberger | H04J 14/0221 398/68 |
| 2015/0055955 | A1 | 2/2015 | Kim et al. | |
| 2015/0055956 | A1 | 2/2015 | Lee et al. | |
| 2015/0139651 | A1 | 5/2015 | Xuejin et al. | |
| 2015/0163011 | A1 | 6/2015 | Lee | |
| 2017/0332159 | A1* | 11/2017 | Du | H04Q 11/0067 |

FOREIGN PATENT DOCUMENTS

| | | |
|---|---|---|
| WO | WO-2015089836 A1 | 6/2015 |
| WO | WO-2015101763 A1 | 7/2015 |
| WO | WO-2015134407 A1 | 9/2015 |

OTHER PUBLICATIONS

European Extended Search Report for EP Application No. 16199618.6 dated Apr. 6, 2017.

* cited by examiner

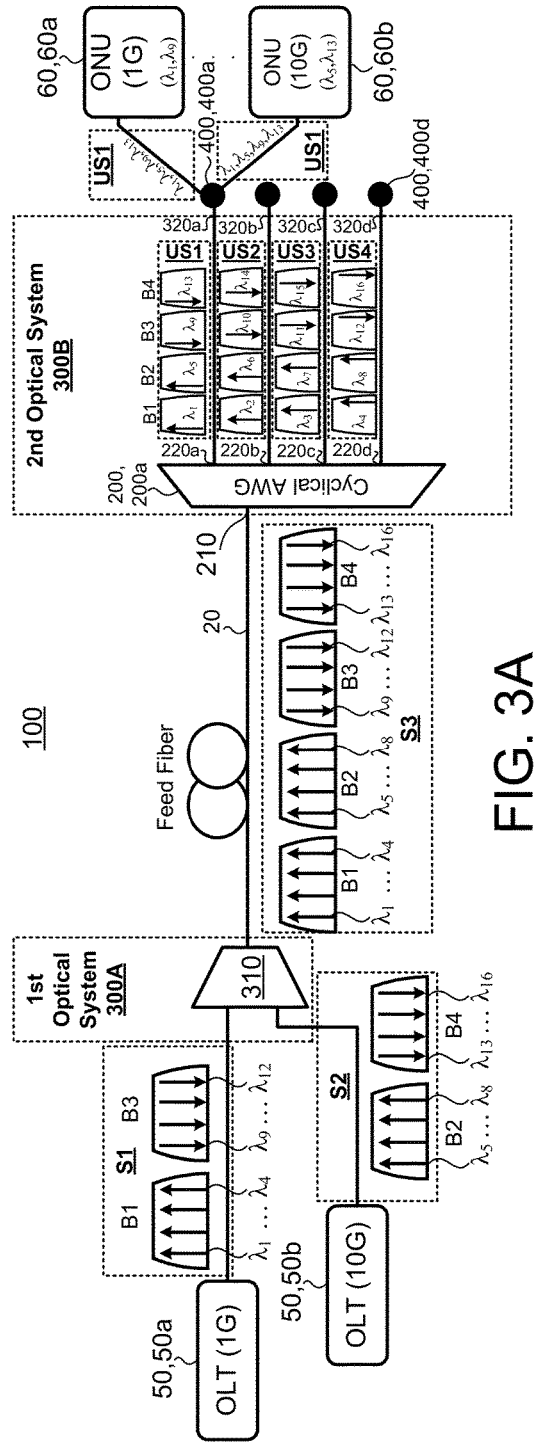
FIG. 3A
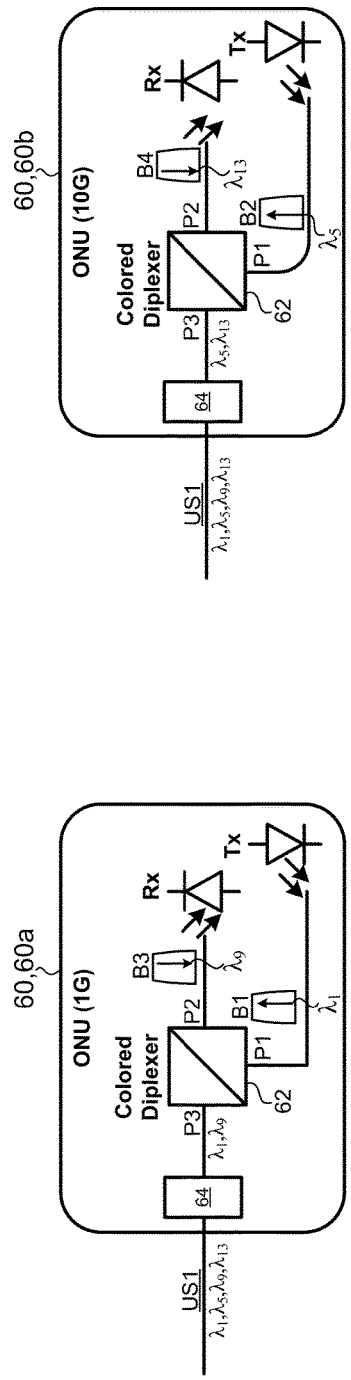
FIG. 3C
FIG. 3B

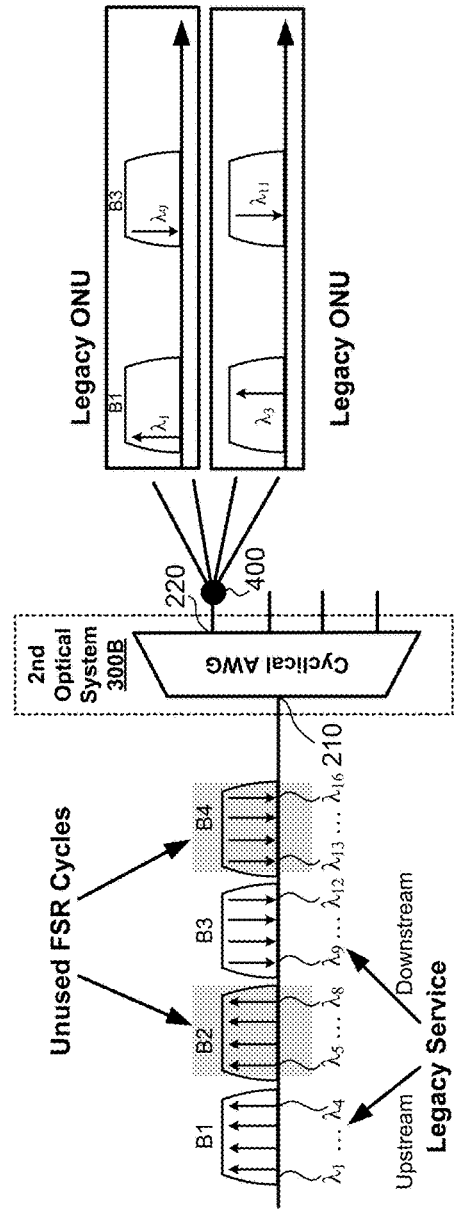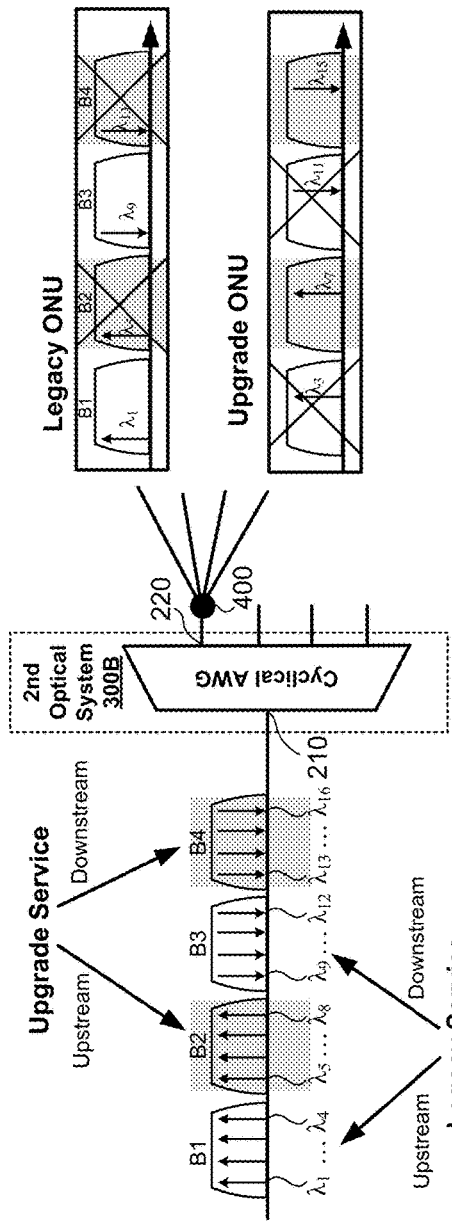

UPGRADING PON SYSTEMS USING A MULTI-CYCLE FIELD AWG

CROSS REFERENCE TO RELATED APPLICATIONS

This U.S. patent application is a continuation of, and claims priority under 35 U.S.C. § 120 from, U.S. patent application Ser. No. 14/952,321, filed on Nov. 25, 2015, which is hereby incorporated by reference in its entirety.

TECHNICAL FIELD

This disclosure relates to upgrading from a legacy passive optical network (PON) system to an updated system using multi-cycle field arrayed waveguide grating router (AWG).

BACKGROUND

A basic communication system includes a transmitter that converts a message to an electrical form suitable to be transferred over a communication channel. The communication channel transfers the message from the transmitter to the receiver. The receiver receives the message and converts it back to its original form.

Fiber optic communication is an emerging method of transmitting information from a source (transmitter) to a destination (receiver) using optical fibers as the communication channel. Optical fibers are flexible, transparent media made of thin glass silica or plastic that transmits light throughout the length of the fiber between the source and the destination. Fiber optic communications allow for the transmission of data over longer distances and at higher bandwidth than other known forms of communications. Fiber optics are an improved form of communication over metal wires because the light traveled through the fiber experiences less loss and is immune to electromagnetic interference. Companies use optical fibers to transmit telephone signals, interne communication, and cable television signals. A fiber-to-the-home (FTTH) network or fiber access network connects the end users using optical fiber as the last mile connection from the service provider.

Fiber-optic communication provides a very low loss of signal and very high-bandwidth. These two properties allow service providers to directly connect to end-users from their central office (CO) using a passive fiber plant, which produces capital and operational cost savings. As demand for bandwidth in today's Internet continues to increase, as Fiber-to-the-home (FTTH) networks have become a good future proof technology for carriers to wire and rewire customers.

SUMMARY

In a fiber access network, upgrading from one technology to another may be difficult due to updates in hardware at a central office (CO) and at optical network units (ONUs) located at customer premises. In a typical passive optical network (PON), each optical line terminal (OLT) in the CO serves multiple ONUs. Therefore, upgrading the access network may be challenging due to the difficulty in coordinating the timing of hardware upgrades at the ONUs with individual customers. This disclosure provides a system and method of upgrading an access network while providing two concurrent services, a legacy service and an upgraded service, until all the legacy hardware at the ONUs has been upgraded smoothly and gradually.

One aspect of the disclosure provides a communication system. The system includes a first optical system, a second optical system, and an optical feed fiber connecting the two optical systems. The first optical system includes a multiplexer configured to multiplex and demultiplex between a first optical line terminal signal, a second optical line terminal signal, and a feeder optical signal. The feeder signal includes the first optical line terminal signal and the second optical line terminal signal. The first optical line terminal signal includes a wavelength in a first upstream free spectral range and a wavelength in a first downstream free spectral range. The second optical line terminal signal includes a wavelength in a second upstream free spectral range and a wavelength in a second downstream free spectral range. The optical feed fiber is optically connected with the first optical system and arranged to convey the feeder optical signal. The second optical system is optically connected with the optical feed fiber and configured to multiplex and demultiplex between the feeder optical signal and optical network unit signals. Each optical network unit signal includes a first upstream wavelength in the first upstream free spectral range, a first downstream wavelength in the first downstream free spectral range, a second upstream wavelength in the second upstream free spectral range, and a second downstream wavelength in the second downstream free spectral range.

Implementations of the disclosure may include one or more of the following optional features. In some implementations, the second optical system includes a cyclical arrayed waveguide grating. The second optical system may also include an arrayed waveguide grating having outputs optically connected to optical couplers, each coupler combining at least two outputs. The system may include a first optical line terminal optically connected with the first optical system and a second optical line terminal optically connected with the first optical system. The first optical line terminal may transmit/receive the first optical line terminal signal and the second optical line terminal may transmit/receive the second optical line terminal signal.

In some examples, the system includes a first optical network unit connected with the second optical system and configured to receive an optical network unit signal. The optical network unit signal has the first upstream wavelength in the first upstream free spectral range and the first downstream wavelength in the first downstream free spectral range. The system may include a second optical network unit connected with the second optical system and configured to receive the optical network unit signal. The optical network unit signal has the second upstream wavelength in the second upstream free spectral range and the second downstream wavelength in the second downstream free spectral range.

In some examples, the system includes an optical power splitter connected with the second optical system and the first and second optical network units. The optical power splitter may be configured to split the optical network unit signal received from the second optical system for delivery to the first and second optical network units and combine a first upstream signal from the first optical network unit and second upstream signal from the second optical network unit for delivery of the optical network signal from the first and second optical network units to the second optical system. The first optical network unit and the second network unit may operate using different protocols. The first optical network unit and the second optical network unit may each include a fixed band-pass filter. The first upstream free spectral range and the first downstream free spectral range may be associated with a first protocol, and the second upstream free spectral range and the second downstream free spectral range are associated with a second protocol, different from the first protocol.

Another aspect of the disclosure provides method for operating the communication system. The method includes receiving, at a first optical system, and multiplexing/demultiplexing between a first optical line terminal signal, a second optical line terminal signal, and a feeder optical signal including the first optical line terminal signal and the second optical line terminal signal. The first optical line terminal signal includes a wavelength in the first upstream free spectral range and a wavelength in the first downstream free spectral range. The second optical line terminal signal includes a wavelength in the second upstream free spectral range and a wavelength in the second downstream free spectral range. The method also includes transmitting the feeder optical signal between the first optical system and a second optical system. The method further includes receiving, at the second optical system, and multiplexing/demultiplexing between the feeder optical signal and optical network unit signals. Each optical network unit signal includes a first upstream wavelength in the first upstream free spectral range, a first downstream wavelength in the first downstream free spectral range, a second upstream wavelength in the second upstream free spectral range, and a second downstream wavelength in the second downstream free spectral range.

This aspect may include one or more of the following optional features. The method may include transmitting at least one of the optical network unit signals from the second optical system to a first optical network unit and a second optical network unit. The first optical network unit may be optically connected with the second optical system and configured to receive an optical network unit signal having the first upstream wavelength in the first upstream free spectral range and the first downstream wavelength in the first downstream free spectral range. The second optical network unit may be optically connected with the second optical system and configured to receive an optical network unit signal having the second upstream wavelength in the second upstream free spectral range and the second downstream wavelength in the second downstream free spectral range.

In some examples, the first optical network unit and the second network unit operate using different protocols. The first optical network unit and the second optical network unit may each include a fixed band-pass filter. The first upstream free spectral range and the first downstream free spectral range may be associated with a first protocol, and the second upstream free spectral range and the second downstream free spectral range may be associated with a second protocol different from the first protocol. The first optical system may include a multiplexer and the second optical system may include a cyclical arrayed waveguide grating. The second optical system may include an arrayed waveguide grating having outputs, wherein at least two outputs are optically connected with a coupler.

Yet another aspect of the disclosure provides a second method for operating the system. The method includes receiving, at an optical system, a feeder optical signal and optical network unit signals. The method also includes multiplexing/demultiplexing, at the optical system, between the feeder optical signal and the optical network unit signals. For a first period of time, the feeder optical signal includes a first optical line terminal signal including a wavelength in the first upstream free spectral range and a wavelength in the first downstream free spectral range, and each optical network unit signal includes a first upstream wavelength in the first upstream free spectral range and a first downstream wavelength in the first downstream free spectral range. For a second period of time subsequent to the first period of time, the feeder optical signal includes the first optical line terminal signal and a second optical line terminal signal. The second optical line terminal signal includes a wavelength in the second upstream free spectral range and a wavelength in the second downstream free spectral range. Each optical network unit signal includes the first upstream wavelength in the first upstream free spectral range, the first downstream wavelength in the first downstream free spectral range, a second upstream wavelength in the second upstream free spectral range, and a second downstream wavelength in the second downstream free spectral range.

In some implementations, the method includes, for the first period of time, transmitting at least one of the optical network unit signals from the optical system to a first optical network unit optically connected with the optical system and configured to receive an optical network unit signal having the first upstream wavelength in the first upstream free spectral range and the first downstream wavelength in the first downstream free spectral range. For the second period of time, the method may include transmitting at least one of the optical network unit signals from the optical system to a first optical network unit and a second optical network unit. The first optical network unit may be optically connected with the optical system and configured to receive an optical network unit signal having the first upstream wavelength in the first upstream free spectral range and the first downstream wavelength in the first downstream free spectral range. The second optical network may be optically connected with the optical system and configured to receive an optical network unit signal having the second upstream wavelength in the second upstream free spectral range and the second downstream wavelength in the second downstream free spectral range. The first optical network unit and the second network unit may operate using different protocols. The first optical network unit and the second optical network unit may each include a fixed band-pass filter.

For a third period of time subsequent to the second period of time, the feeder optical signal may include the second optical line terminal signal absent the first optical line terminal signal. Each optical network unit signal may include the second upstream wavelength in the second upstream free spectral range and the second downstream wavelength in the second downstream free spectral range, absent the first upstream wavelength in the first upstream free spectral range and the first downstream wavelength in the first downstream free spectral range. For the third period of time, the method may include transmitting at least one of the optical network unit signals from the optical system to a second optical network unit optically connected with the optical system and configured to receive an optical network unit signal having the second upstream wavelength in the second upstream free spectral range and the second downstream wavelength in the second downstream free spectral range.

The first upstream free spectral range and the first downstream free spectral range may be associated with a first protocol, and the second upstream free spectral range and the second downstream free spectral range may be associated with a second protocol different from the first protocol. The second optical system may include a cyclical arrayed waveguide grating. The optical system may further include an arrayed waveguide grating having outputs, wherein at least two outputs are optically connected with a coupler.

In yet another aspect of the disclosure, a communication system includes an optical system that receives a feeder optical signal from an optical feeder optically connected with the optical system. The optical system is configured to multiplex and demultiplex between the feeder optical signal and optical network unit signals. Each optical network unit signal includes a first upstream wavelength in a first upstream free spectral range, a first downstream wavelength in the first downstream free spectral range, a second upstream wavelength in the second upstream free spectral range, and a second downstream wavelength in the second downstream free spectral range. The optical system has an optical system input for receiving the feeder optical signal and optical system outputs for outputting the optical network unit signals.

In some implementations, the optical system includes an arrayed waveguide grating having arrayed waveguide grating outputs optically connected with optical couplers. Each optical coupler combines at least two arrayed waveguide grating outputs, and each optical coupler is optically connected to one of the optical system outputs. The optical system may include a cyclical arrayed waveguide grating.

The communication system may further include a first optical network unit and a second optical network unit. The first optical network unit is optically connected with the optical system and configured to receive an optical network unit signal. The optical network unit signal has the first upstream wavelength in the first upstream free spectral range and the first downstream wavelength in the first downstream free spectral range. The second optical network unit is optically connected with the optical system and configured to receive the optical network unit signal. The optical network unit signal has the second upstream wavelength in the second upstream free spectral range and the second downstream wavelength in the second downstream free spectral range. In some examples, the communication system further includes an optical power splitter in communication with one of the outputs of the optical system and the first and second optical network units. The optical power splitter is configured to: split the optical network unit signal received from the optical system for delivery to the first and second optical network units; and combine a first upstream signal from the first optical network unit and second upstream signal from the second optical network unit for delivery of the optical network signal from the first and second optical network units to the optical system. In some examples, the first optical network unit and the second network unit operate using different protocols. The first optical network unit and the second optical network unit may each include a fixed bandpass filter.

In some examples, the first upstream free spectral range and the first downstream free spectral range are associated with a first protocol. The second upstream free spectral range and the second downstream free spectral range are associated with a second protocol different from the first protocol.

Another aspect of the disclosure provides a method for receiving, at an optical system, a feeder optical signal and optical network unit signals, and multiplexing/demultiplexing, at the optical system, between the feeder optical signal and the optical network unit signals. For a first period of time, the feeder optical signal includes a first optical line terminal signal and a second optical line terminal signal. The first optical line terminal signal includes a wavelength in a first upstream free spectral range and a wavelength in a first downstream free spectral range. The second optical line terminal signal includes a wavelength in a second upstream free spectral range and a wavelength in a second downstream free spectral range. Each optical network unit signal includes a first upstream wavelength in the first upstream free spectral range, a first downstream wavelength in the first downstream free spectral range, a second upstream wavelength in the second upstream free spectral range, and a second downstream wavelength in the second downstream free spectral range. In addition, for a second period of time subsequent to the first period of time, the feeder optical signal includes the second optical line terminal signal absent the first optical line terminal signal. Each optical network unit signal includes the second upstream wavelength in the second upstream free spectral range, and a second downstream wavelength in the second downstream free spectral range, absent the first upstream wavelength in the first upstream free spectral range and the first downstream wavelength in the first downstream free spectral range.

In some examples, the method further includes for a third period of time subsequent to the second period of time, the feeder optical signal includes a third optical line terminal signal and the second optical line terminal signal. The third optical line terminal signal includes a wavelength in the first upstream free spectral range and a wavelength in the first downstream free spectral range. The second optical line terminal signal includes a wavelength in the second upstream free spectral range and a wavelength in the second downstream free spectral range. Each optical network unit signal includes a third upstream wavelength in the first upstream free spectral range, a third downstream wavelength in the first downstream free spectral range, the second upstream wavelength in the second upstream free spectral range, and the second downstream wavelength in the second downstream free spectral range. The third upstream wavelength may be the same as the first upstream wavelength, and the third downstream wavelength may be the same as the first downstream signal. In some examples, the wavelengths of the first upstream spectral range and the wavelengths of the first downstream free spectral range are associated with a first protocol for the first period of time and a second protocol for the third period of time. In addition, the wavelengths of the second upstream free spectral range and the second downstream free spectral range are associated with a third protocol for the first, second, and third periods of time. The third protocol is different than the first and/or second protocol.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3A is a schematic view of an example network with a two-tier service over a four-cycle AWG.

FIG. 3B is a schematic view of an example ONU of a first service of the two-tier service.

FIG. 3C is a schematic view of an example ONU of a second service the two-tier service.

FIGS. 4A-4D are schematic views of example methods and steps of upgrading a legacy network.

Like reference symbols in the various drawings indicate like elements.

DETAILED DESCRIPTION

Fiber to the home (FTTH) is regarded as the end state of broadband access networks as fiber offers virtually unlimited bandwidth. FTTH replaces currently used copper infrastructure (e.g., telephone wires, coaxial cable, etc.). Multiplexing is a method used in optical networks to utilize the large bandwidth of optics to their full benefits. Multiplexing enables several virtual channels to be formed on a single fiber. Therefore, multiplexing several optical signals increases the utility of a network infrastructure. Time division multiplexing (TDM) is a method used to multiplex several signals onto one high-speed digital signal on a fiber optic link. TDM multiplexes several signals by establishing different virtual channels using different time slots. Wavelength division multiplexing (WDM) multiplexes the signals by having different channels use different wavelengths; separate lasers generate these channels and their traffic typically does not interact.

A laser is a high-frequency generator or oscillator, which requires amplification, feedback, and a tuning mechanism that determines the frequency. Lasers emit light coherently such that the laser output is a narrow beam of light. In some implementations, a laser includes a medium that provides the amplification and the frequency, and mirrors that provide the feedback. Photons bounce off one mirror through the medium and head back to another mirror to bounce back for further amplification. One, and sometimes both mirrors, may partially transmit light to allow a fraction of the generated light to be emitted. A laser diode is an electrically pumped semiconductor laser having an active medium being a p-n junction. The p-n junction is created by doping (i.e., introduction of impurities into a pure semiconductor to change its electrical properties).

Figure 1A:
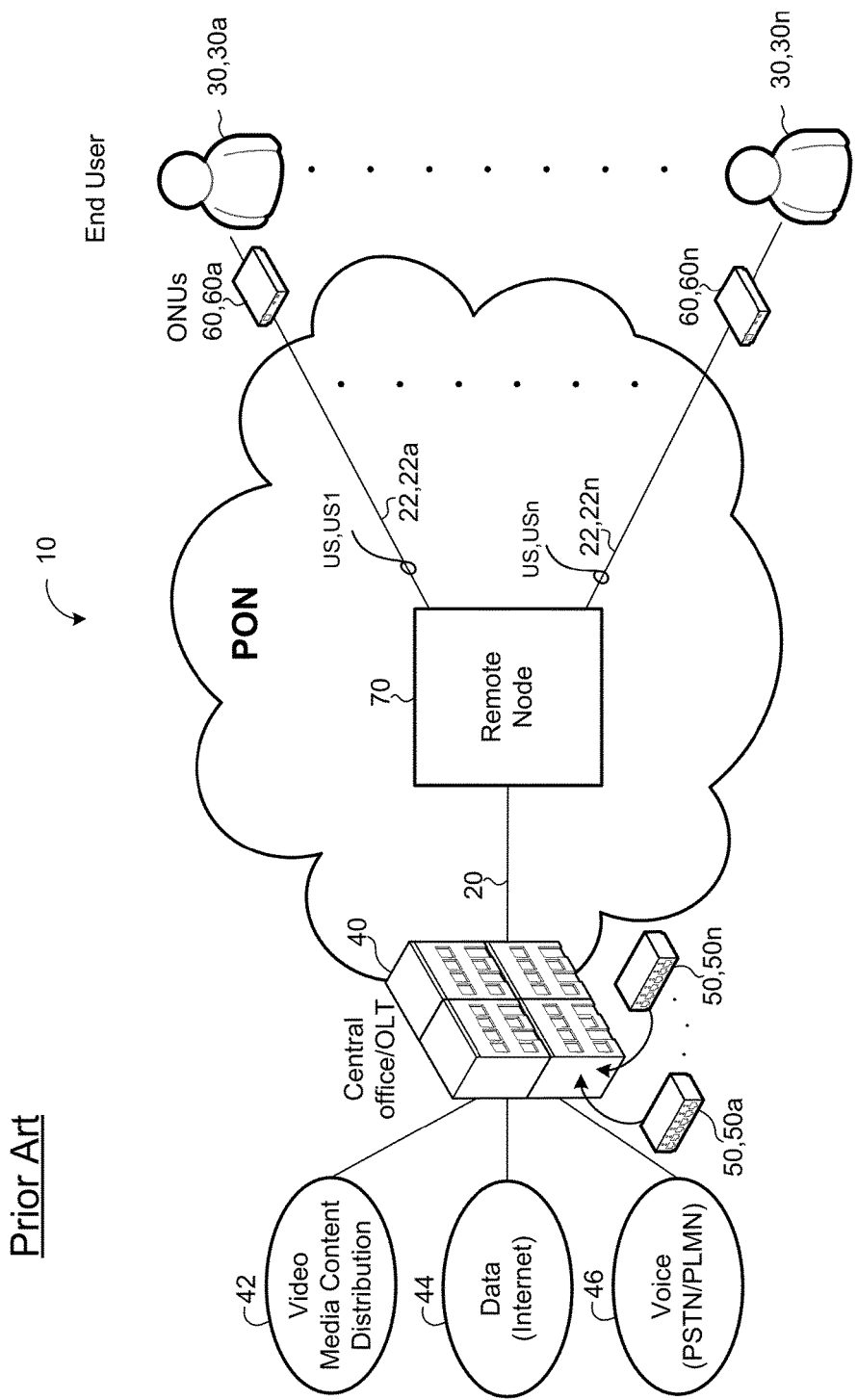
FIG. 1A is a schematic view of an example prior art passive optical network using an exemplary wavelength tunable laser.

Fiber-to-the-home (FTTH) is the delivery of a communication signal through optical fibers from an optical line terminal (OLT) housed in a central office (CO) to a home or a business. Referring to FIG. 1A, today's FTTH systems are mostly offered through point-to-multi-point time division multiplexed (TDM) passive optical networks 10 (PONs) using a passive optical power splitter at a remote node 70 (RN) in the field to share a common transceiver 50 (OLT) at the CO 40, or through point-to-point (pt-2-pt) direct connection such as using optical Ethernets (not shown), where a home-run fiber extends all the way back to a CO and each customer is terminated by a separate transceiver, as opposed to the shared transceiver 50 (TDM) as shown. A PON 10 is a point-to-multipoint network architecture that uses optical power splitters to enable a single optical feed fiber 20 to serve multiple users 30a-30n (e.g. 16-128). PON 10 provides optical signals from a CO 40 and includes an optical transmitter/receiver or transceiver 50 to a number of optical network terminals (ONUs) 60 on the customer premises that each includes a bidirectional optical transceiver.

Compared to pt-2-pt home run systems, a TDM-PON provides beneficial savings in the number of feeder fibers 20 (between a remote node 70 and the central office 40), and in the number of optical transceivers 50 at the CO 40 while saving patch panel space to terminate fibers. However, TDM-PON does not scale well with bandwidth growth. The bandwidth per household is often oversubscribed, since the bandwidth per optical line terminal transceiver at the central office 40 is shared among all ONUs 60 that are connected to an OLT 40.

Pt-2-pt systems provide high bandwidth to end users 30; however, pt-2-pt uses a great number of both trunk fibers 20 and optical transceivers 50. Thus, pt-2-pt systems do not scale well with the OLT 50 at the CO 40 and the fiber count between the CO 40 and the RN 70, resulting in greater space requirements, higher power, and an increased cost.

The CO 40 receives information, such as video media distribution 42, interne data 44, and voice data 46 that may be transferred to the end users 30. The CO 40 includes an optical line terminal (OLT) 50 connecting the optical access network to an IP, ATM, or SONET backbone, for example. Therefore, the OLT 50 is the endpoint of the PON 10 and converts the electrical signals used by a service provider's equipment and the fiber optic signals used by the PON 10. In addition, the OLT 50 coordinates multiplexing between the conversion devices at the user end 30. The OLT 50 sends the fiber optic signal through a feeder fiber 20, and the signal is received by a remote node 70, which demultiplexes the signal and distributes it to multiple users 30. In some examples, each CO 40 includes multiple OLTs 50, 50a-n. Each OLT 50 is configured to provide a signal to a group of users 30. In addition, each OLT 50 may be configured to provide signal or services that are in different service, e.g., one OLT provides services in 1G-PON and another provides services in 10G-PON (as will be discussed later). Where the CO 40 includes more than one OLT 50, the signals of multiple OLT can be multiplexed to form a time-wavelength division multiplexed (TWDM) signal (e.g., first optical system 300A that includes a multiplexer 310 as shown in FIG. 3A) before sending it to the remote node 70.

Multiplexing combines several input signals and outputs a combined signal having separate signals. The multiplexed signal is transmitted through a physical wire, e.g., single optical fiber 20, which saves the cost of having multiple wires for each signal. As shown in FIG. 1, the CO 40 multiplexes the signals received from several sources, such as video media distribution 42, Internet data 44, and voice data 46, and multiplexes the received signals into one multiplexed signal before sending the multiplexed signal to the remote node 70 through the feeder fiber 20. The multiplexing may be performed by the OLT 50 or a broadband network gateway (BNG) positioned at the CO 40. Typically, most services are TDM multiplexed on the packet layer. Video content may be carried using Internet protocol (IP) and packet multiplex, or may be a radio frequency overlay on a different wavelength. Each OLT 50, 50a-n contains a carrier source (e.g., a laser diode or a light emitting diode) for generating an optical signal that carries the multiplexed signal to the end user 30. On the customers' end, i.e., the ONU 60 at the user end, a reverse process occurs using a demultiplexer (DEMUX). The demultiplexer receives the multiplexed signal and divides it into the separate original signals that were originally combined. In some examples, a photodetector converts the optical wave back into its electric form and is located at the remote node or at the end user 30. The electrical signal is then further de-multiplexed down to its subcomponents (e.g., data over a network, sound waves converted into currents using microphones and back to its original physical form using speakers, converting images converted into currents using video cameras and converting back to its physical form using a television). In TDM PONs, the demultiplexing of the signal occurs after the photodiode in the electrical domain.

A transceiver or ONU 60, on the user end, includes a carrier source (e.g., laser diode or light-emitting diode) for generating an optical signal that carries the information to be sent from an end user 30 to the CO 40. As shown, one feeder fiber 20 is employed from the CO 40 to a remote node 70, where the signal is split by a second optical system 300B and distributed to, for example, optical network units 60*a*-60*n*.

Commercial FTTH systems are mostly implemented with TDM (time division multiplexed) PON (passive optical network) technologies (e.g., G-PON or E-PON). A TDM-PON shares a single OLT transceiver 50 at the CO 40 with multiple end customers 30 using a splitter at the remote node 70. The central office 40 receives information, such as video media distribution 42, interne data 44, and voice data 46 that may be transferred to the end users 30. The CO 40 includes an optical line terminal 50 (OLT) connecting the optical access network to an IP, ATM, or SONET backbone. Therefore, the OLT 50 device is the endpoint of the PON 10 and converts the electrical signals used by a service provider's equipment and the fiber optic signals used by the PON 10. In addition, the OLT 50 coordinates multiplexing between the conversion devices (e.g., the ONUs) at the user end 30. The OLT 50 sends the fiber optic signal through a feeder fiber 20, and the signal is received by a remote optical distribution node 70, which splits or demultiplexes the optical signal using second optical system 300B and distributes it to multiple users 30.

The most commonly deployed TDM-PON systems are the GPON system standardized by ITU (International Telecommunication Union) and the EPON system standardized by IEEE (Institute of Electrical and Electronics Engineers). A GPON system offers 2.5 Gb/s downstream bandwidth and 1.25 Gb/s upstream bandwidths, shared on the feeder fiber 20, 22 among the users 30, and connected to the same OLT transceiver 50. GPON systems are mature and very cost effective. TDM PON faces difficulty in bandwidth scaling as the optical transceivers of both the OLT 50 and the ONU 60 ends need to operate at the aggregate bandwidth of all of the ONUs sharing the same OLT. TDM-PONs typically have a 1:16 to 1:64 power splitting ratio. The average bandwidth per user and PON reach scales inversely with respect to the splitting ratio.

Figure 1B:
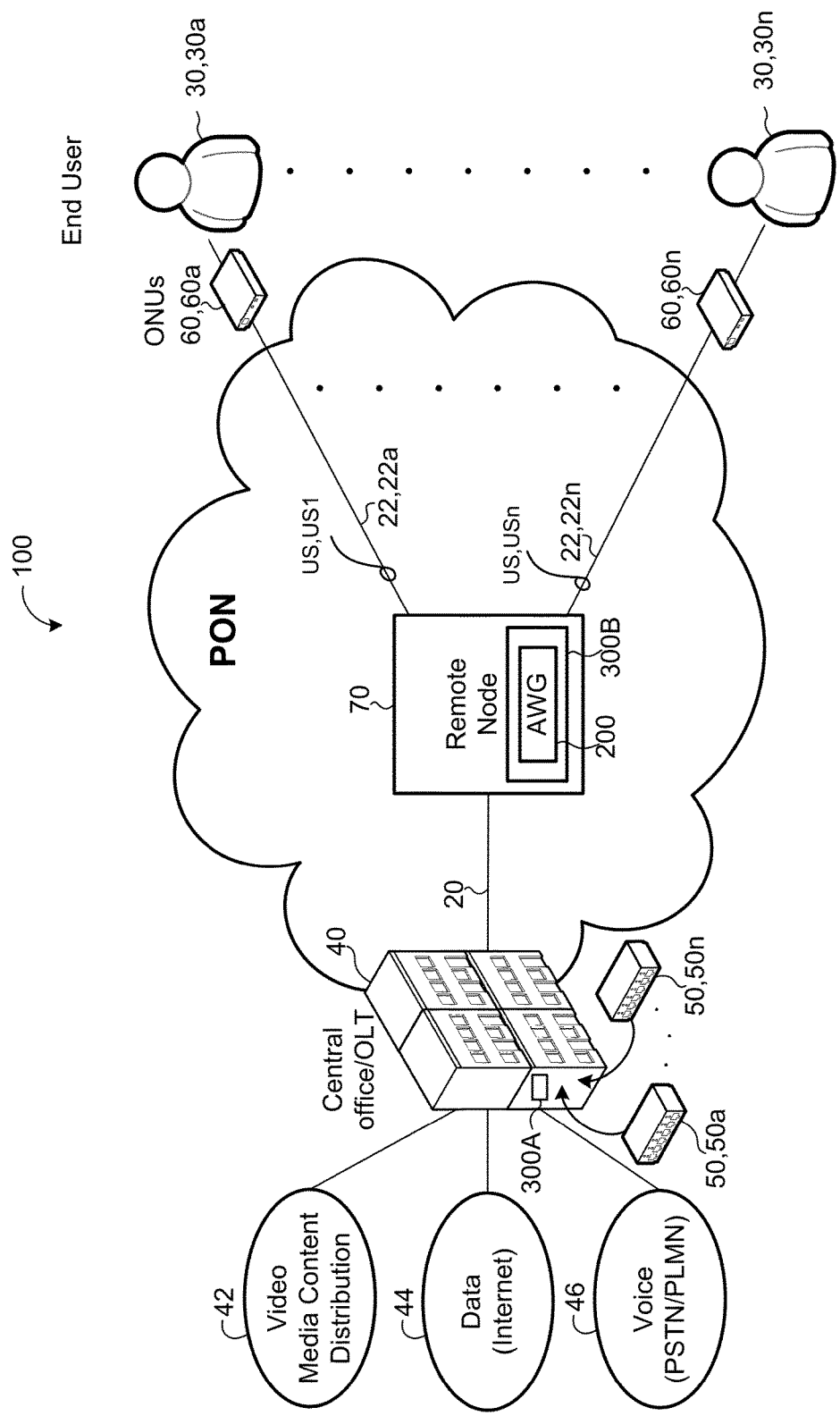
FIG. 1B is a schematic view of an example passive optical network using an exemplary wavelength tunable laser and using multi-wavelength feeder fibers.

Rapidly increasing internet applications are straining the bandwidth available from legacy TDM-PON systems. To overcome the long-term increase in bandwidth demand, a migration to WDM or TWDM-PON (Time-Wavelength Division Multiplexing) with higher ONU count per feeder fiber 20 is evident to be able to accommodate the increase in bandwidth demand and take rate. Wavelength division multiplexing (WDM) PON gives each user 30 a dedicated wavelength in each transmission direction. In a WDM-PON network, each user 30 is allocated a different wavelength λ for upstreaming data to the CO 40. Therefore, each ONU 60 uses a wavelength-specific transmitter, such a tunable wavelength laser 200, to transmit data to the CO 40 at different wavelengths λ. The tunable wavelength laser may be tuned at the time of deployment for each particular path 22 (corresponding to a user 30), which allows the use of one type of transceiver by all users 30. A TWDM-PON network architecture combines the cost advantage of supporting multiple users 30 on a single wavelength with the wavelength flexibility of WDM-PON, which provides service to multiple users via a single fiber and better utilizes WDM-PON components (e.g., Erbium-Doped Fiber amplifiers (EDFAs)). As previously discussed, to efficiently upgrade the network, a cyclical AWG 200 is used at the RN 70. Therefore, it is desirable to design an access network 100 as shown in FIG. 1B that is capable of being upgraded seamlessly from a one TWDM-PON architecture to another TWDM-PON, without the users 30 experiencing an outage other than during the changing of the equipment at their house, where each TWDM-PON provides different services (e.g., different PON rates for upstreaming and/or downstreaming or different PON protocols). When upgrading the access network 100, hardware changes at the CO 40 must be coordinated with hardware changes at the user's premises (e.g., ONUs 60). Since in a TWDM-PON network each OLT 50 in the CO 40 serves multiple ONUs 60, which are located at individual users' houses, it may be impossible to upgrade all the customer hardware (ONUs 60) on the PON 100 simultaneously. This will cause customers 30 that are slow to upgrade their equipment to loose service altogether until they perform their upgrade. Therefore, it is beneficial for the interne service provider (ISP) to find a way to concurrently service two PON protocols, i.e., the legacy TWDM-PON and the upgrade TWDM-PON, until all users 30 have upgraded their ONUs 60 to the upgrade TWDM-PON. To accommodate such an upgrade, a cyclical wavelength demultiplexer, such as a cyclical arrayed waveguide grating 200, is used at the RN 70. The use of the cyclical AWG 200 eliminates the need to use tunable filters at the ONUs 60, which are much more expensive than non-tunable filters. In addition, the use of cyclical AWG 200 at the remote node 70 has a lower link loss than a large-port-count power splitter.

Previously proposed TWDM PONs use an optical power splitter at the RN 70 to connect multiple ONUs 60 to each OLT 50. When a large number of wavelengths are transmitted over an optical power splitter, each ONU 60 includes a blocking filter to block out of band wavelengths. In some examples, a tunable ONU 60 is used and includes a tunable narrow band filter. Use of a tunable ONU 60 increases the cost of each ONU 60, which leads to an increase in the cost of the network 100. Moreover, the power splitter at the RN 70 may not achieve large split ratios because the total power loss for a large splitter is difficult to overcome by the transmitters and receivers at the OLTs 50 and ONUs 60. Therefore, it is desirable to use a wavelength selective (de)multiplexer, such as the cyclical arrayed waveguide grating router (AWG) 200 to greatly increases the maximum split ratio and remove the need for narrow-band filters at the ONUs 60, thereby reducing the cost (by not using tunable receivers). Additionally, the cyclical AWG 200 decouples the loss from the number of ports, thereby allowing a higher split ratio with lower loss. In addition, to maximize the number of users 30 on a single fiber feed 20, 22 using TWDM-PON, a passive splitter 400 may be used following the second optical system 300A (that includes the cyclical AWG 200). Thus, the cyclical AWG 200 greatly increases the efficiency of TWDM-PONs. Multiple TDM PONs (e.g., 1G-PON and 10G-PON) using an AWG 200 may be thought of as a TWDM-PON, since WDM is utilized to increase overall capacity of the network.

Figure 2A:
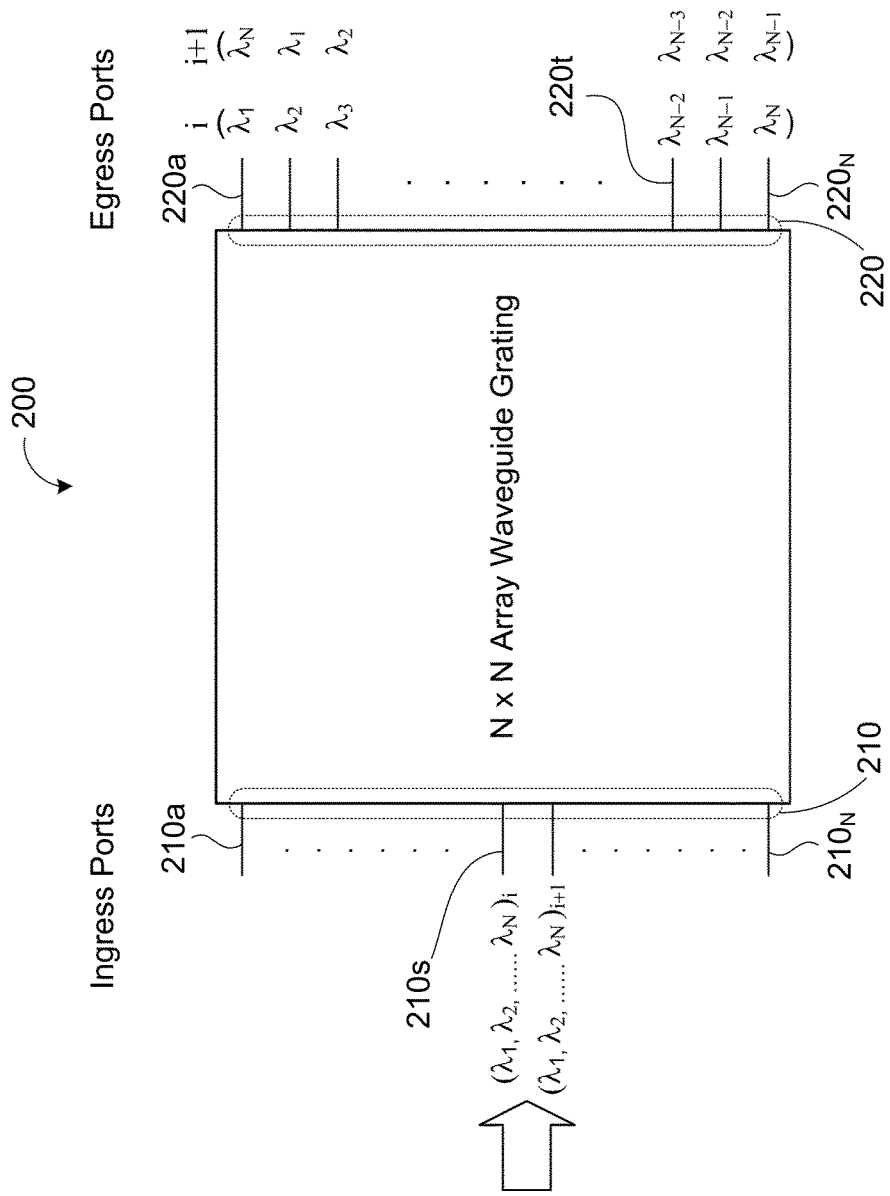
FIGS. 2A and 2B are schematic views of example arrayed waveguide gratings (AWGs).
Figure 2B:
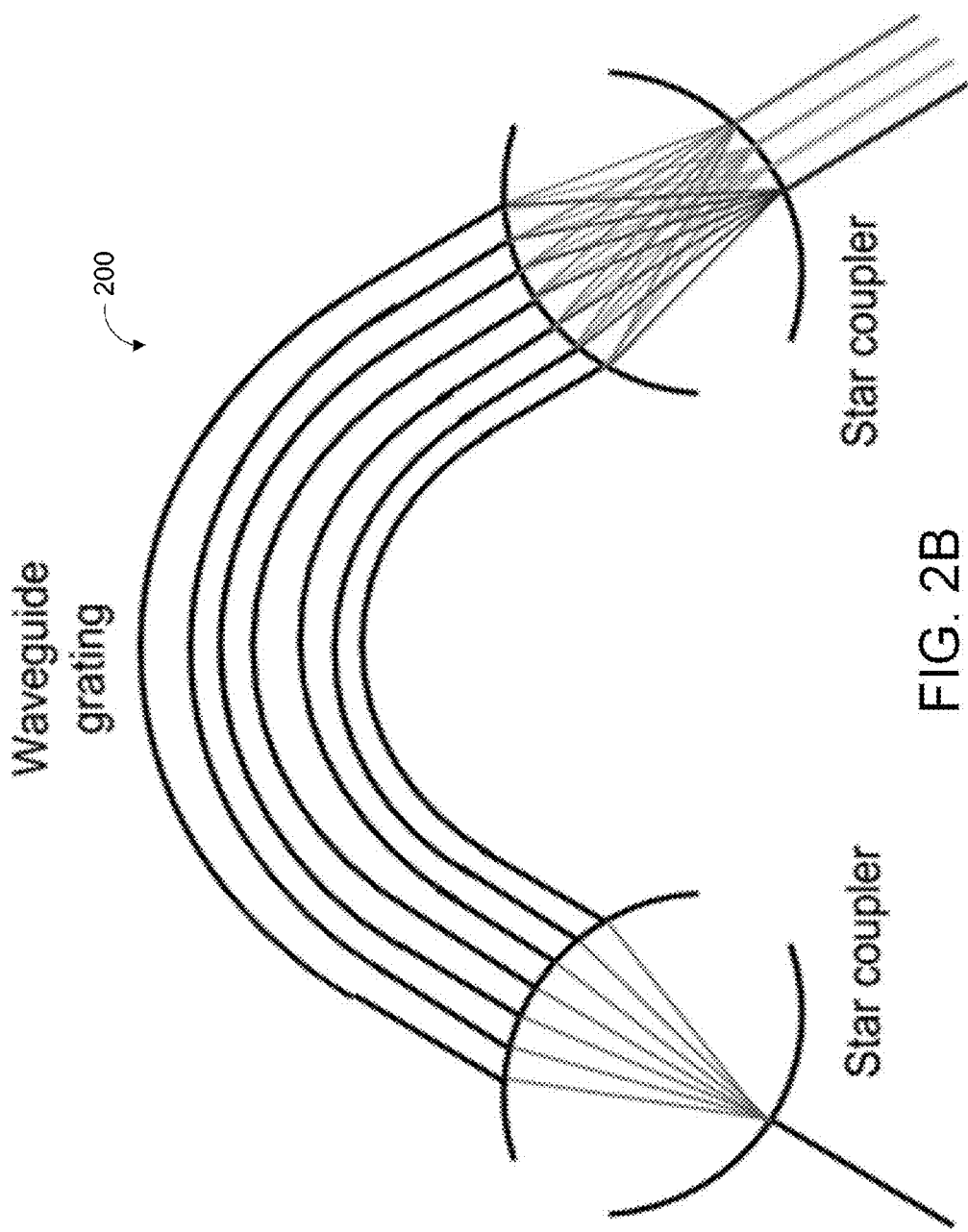

FIGS. 2A and 2B illustrate an exemplary arrayed waveguide grating 200 (AWG). An AWG 200 may be used to demultiplex an optical signal in a WDM or a TWDM system. AWGs 200 can multiplex a large number of wavelengths into one optical fiber, thus increasing the transmission capacity of optical networks. AWGs 200 can therefore multiplex channels of several wavelengths onto a single optical fiber at a transmission end, and reciprocally they can also demultiplex different wavelength channels at the receiving end of an optical communication network. An AWG 200 is a passive planar light wave circuit device typically used in optical networks as a wavelength multiplexer and/or demultiplexer. N×N AWGs 200 also have wavelength routing capabilities. If a system has N equally-spaced wavelengths $\lambda_N$, an N×N AWG 200 can be designed with an egress port spacing matching the wavelength spacing. The N×N AWG 200 routes differing wavelengths at an ingress port 210 to different egress ports 220 such that all N wavelengths are mapped to all N egress ports 220N sequentially. The routing of the same N wavelengths at two consecutive ingress ports 210 have the wavelength mapping shifted by one egress side. In addition, the wavelength channels on any ingress repeat at the FSR. In some implementations, the AWG 200 receives a first multiplexed optical signal at a first input 210a (e.g., input 1) via a first optical fiber 10a. The AWG 200 demultiplexes the received signal and outputs demultiplexed signals through its outputs 220, 220a-n (e.g., outputs 1-32).

The AWG 200 is cyclic in nature. The wavelength multiplexing and demultiplexing property of the AWG 200 repeats over periods of wavelengths called free spectral range (FSR). Multiple wavelengths, separated by the free spectral range (FSR), are passed down each port 220. Therefore, by utilizing multiple FSR cycles, different tiered services may coexist on the same fiber plant 20, 22.

In some implementations, to construct a low-loss cyclic AWG 200, the star couplers and the waveguide grating should be carefully designed. The arrayed waveguides in the fiber grating should be correctly engineered. The phase difference between waveguides in the grating is a factor that determines the FSR B1-B4 of the AWG 200. The channel-by-channel loss profile within one FSR B1-B4 is related with the overlap integral between the eigenmode (natural vibration of the AWG 200) of the output channel waveguide and beamlets diffracted from the waveguide arms in the grating. The end channels of any FSR B1-B4 typically have a larger loss and compromised pass-band. It is usually optimal to design around four or six more channels than the desired number of channels, thereby wasting four or six channels of bandwidth per cycle, respectively.

The disadvantage of using a cyclic AWG 200 with small FSR is that the channel spacing may vary slightly from cycle to cycle. The wavelength spacing may be wider for longer wavelengths. However, besides waveguide arm phase difference, the material dispersion, i.e., the refractive index changing with wavelength, and waveguide cross-section design, also contribute to the variation in channel spacing. The channel spacing can be optimized by proper material choice and waveguide design. Thus, in some examples, a larger AWG 200 is used in combination with splitters (see FIG. 3D).

Figure 2C:
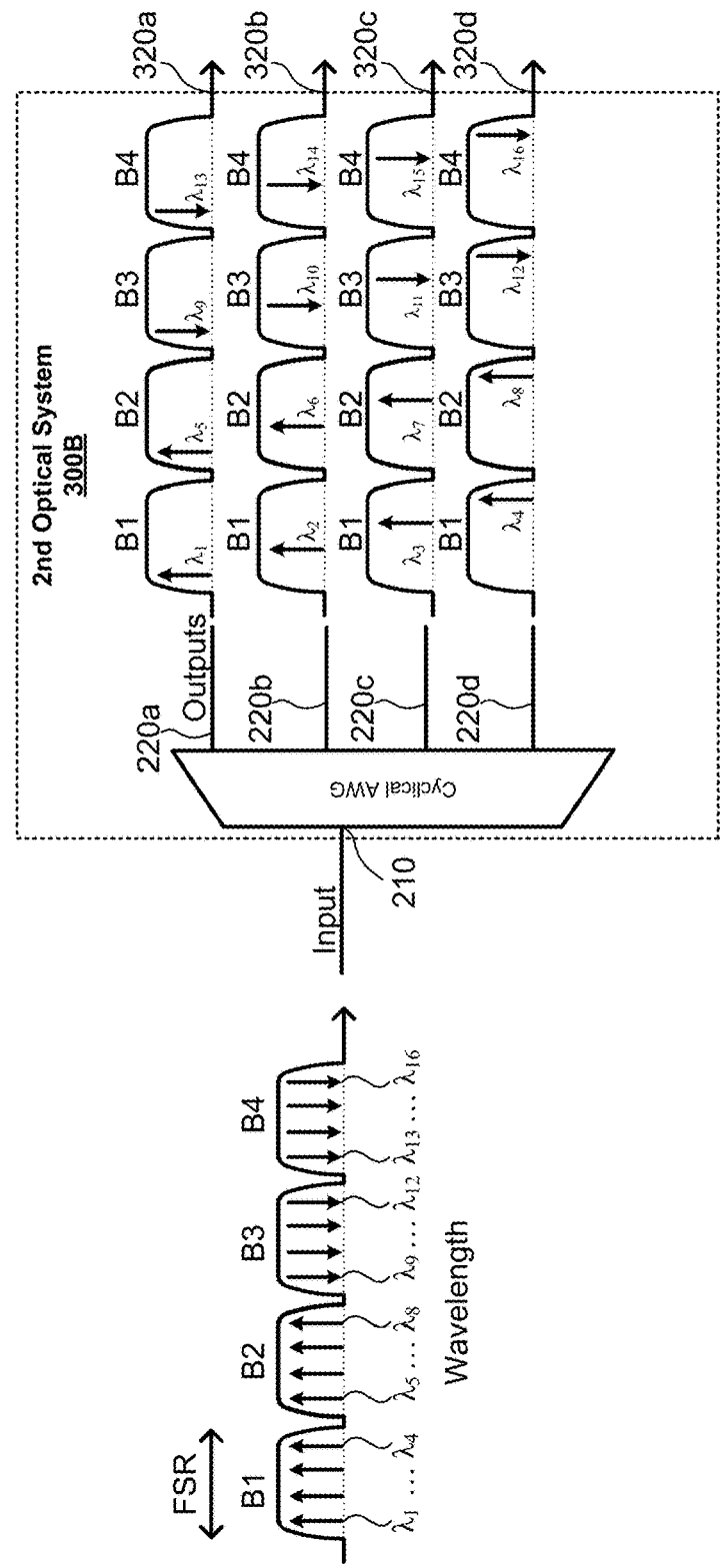
FIG. 2C is a schematic view of the cyclical behavior of the example AWG of FIGS. 2A and 2B.

The AWG 200 may have multiple cycles of optical wavelengths ranges with repeating multiplexing and demultiplexing properties. As shown in FIG. 2C, each cycle B1-B4 is often referred to as FSR. A multi-cycle AWG 200 sends multiple wavelengths $\lambda_1$-$\lambda_{16}$, separated by the FSR, down each port 220, 220a-220d. In most PON systems, different wavelengths are used for upstream and downstream of signals due to the near-far-effect. The near-far effect is a condition where a receiver captures the reflection of a strong signal (usually from its own transmitter), thereby making it impossible for the receiver to detect a weaker signal. Using different Tx and Rx wavelengths allows the use of a wavelength selective device, such as a thin-film filter (TFF), to help achieve the required isolation between the uplink and downlink to overcome the near-far effect. Thus, a WDM-PON platform uses two FSR cycles of the cyclical AWG 200 (one cycle for downstream transmission and the other cycle for upstream transmission) for each tier of service. To add a second platform to a network 100, four usable cycles would allow for the simultaneous use of two platforms. Such a system 100 would deliver signals from both platforms to each of the users 30, and each AWG output 220 would output/receive signals from both platforms. Each AWG output 220 is optically connected with at least one ONU 60, then each ONU 60 would receive signals from both platforms. Having two services hit each ONU 60 is useful during system upgrades and during general use for TWDM systems where each AWG output 220 is connected to multiple ONUs 60 via a power splitter 400.

To further explain the use of two platforms by way of using a cyclical AWG 200, FIG. 2C shows a cyclical AWG 200 having an input 210a and four outputs 220, 210a-220b. The cyclical AWG 200 receives four FSR (bands) B1-B4. FSRs B1 and B2 are used for upstream while FSRs B3 and B4 are used for downstream. FSR B1 includes wavelengths $\lambda_1$-$\lambda_4$, FSR B2 includes wavelengths $\lambda_5$-$\lambda_8$, FSR B3 includes wavelengths $\lambda_9$-$\lambda_{12}$, and FSR B4 includes wavelengths $\lambda_{13}$-$\lambda_{16}$; where $\lambda_1 < \lambda_2 < \lambda_3 < \ldots < \lambda_{15} < \lambda_{16}$. When the cyclical AWG 200 receives the wavelengths $\lambda_1$-$\lambda_{16}$ at its input 210, each wavelength $\lambda_1$-$\lambda_{16}$ is outputted from a different output 220 in a cyclical manner. Therefore, the first wavelength $\lambda_1$ of the first FSR B1 is outputted through the first output 210a of the cyclical AWG 200, the second wavelength $\lambda_2$ of the first FSR B1 is outputted through the second output 210b of the cyclical AWG 200, the third wavelength $\lambda_3$ of the first FSR B1 is outputted through the third output 210c of the cyclical AWG 200, and the fourth wavelength $\lambda_4$ of the first FSR B1 is outputted through the fourth output 210b of the cyclical AWG 200, completing the first cycle. The second cycle begins when the first wavelength $\lambda_5$ of the second FSR B2 is outputted through the first output 210a of the cyclical AWG 200, the second wavelength $\lambda_6$ of the second FSR B2 is outputted through the second output 210b of the cyclical AWG 200, the third wavelength $\lambda_7$ of the second FSR B2 is outputted through the third output 210c of the cyclical AWG 200, and the fourth wavelength $\lambda_8$ of the second FSR B2 is outputted through the fourth output 210b of the cyclical AWG 200, completing the second cycle. The third cycle begins with the first wavelength $\lambda_9$ of the third FSR B3 is outputted through the first output 210a of the cyclical AWG 200, the second wavelength $\lambda_{10}$ of the third FSR B3 is outputted through the second output 210b of the cyclical AWG 200, the third wavelength $\lambda_{11}$ of the third FSR B3 is outputted through the third output 210c of the cyclical AWG 200, and the fourth wavelength $\lambda_{12}$ of the third FSR B3 is outputted through the fourth output 210b of the cyclical AWG 200, completing the third cycle. The fourth cycle begins with the first wavelength $\lambda_{13}$ of the fourth FSR B4 is outputted through the first output 210a of the cyclical AWG 200, the second wavelength $\lambda_{14}$ of the fourth FSR B4 is outputted through the second output 210b of the cyclical AWG 200, the third wavelength $\lambda_{15}$ of the fourth FSR B4 3 is outputted through the third output 210c of the cyclical AWG 200, and the fourth wavelength $\lambda_{16}$ of the fourth FSR B4 is outputted through the fourth output 210b of the cyclical AWG 200, completing the third cycle. In this case, each FSR B1-B4 includes four wavelengths $\lambda_1$-$\lambda_{16}$ (FSR B1 includes wavelengths $\lambda_1$-$\lambda_4$, FSR B2 includes wavelengths $\lambda_5$-$\lambda_8$, FSR B3 includes wavelengths $\lambda_9$-$\lambda_{12}$, FSR B4 includes wavelengths $\lambda_{13}$-$\lambda_{16}$), and the cyclical AWG 200 includes 4 outputs 210. Therefore, one wavelength from each FSR B1-B4 outputs each AWG output 220. In other words, each AWG output 220 outputs a wavelength from an FSR B1-B4. As described, a first platform may use the first FSR B1 for upstreaming and the third FSR B3 for downstream, and the second platform may use the second FSR B2 for upstreaming and the fourth FSR B4 for downstream. Similarly, the network 100 may support three platforms by using six FSR cycles providing three platforms to each user 30. The network may also provide four platforms by using eight FSR cycles, five platforms by using 10 FSR cycles, and so on. In a TWDM-PON architecture, each wavelength $\lambda$ carries multiple users 30, therefore, the network 100 may be configured to operate different protocols of PONs concurrently to serve different tiers of services (e.g., 1 G-PON and 10 G-PON). For example, the service provider at the CO 40 may want to provide a business/premium service on a higher rate upstream/downstream PON and standard residential services on a lower rate upstream/downstream PON. Referring to the example discussed with respect to FIG. 2C, the business/premium service may use one of the first and third FSRs B1, B3 or the second and fourth B2, B4, and the low upstream/downstream rate PON may use the other one of the first and third FSRs B1, B3 or the second and fourth B2, B4. The service that the user 30 receives is determined by their respective the customer premises equipment (CPE), more specifically, their ONU 60. The CPE may be configured to receive one or the other of the business premium service or the low upstream/downstream rate service. In some examples, if the user 30 wants to upgrade from the low upstream/downstream rate service to the business/premium service, the user 30 has to change/upgrade his CPE to be able to receive the upgraded/premium signals that are being transmitted from the CO 40.

As previously described, to increase the network 100 capacity, it is often desirable to overlay multiple services or platforms on the same fiber 20. For example, in TDM-PON architecture, overlaying multiple services is achieved by using a different pair of wavelengths for each platform that is overlaid. Referring to FIGS. 3A-3C, in some implementations, a TDM-PON architecture 100 overlays two different services, e.g., 1G-PON MAC 50a and 10G-PON MAC 50b. The network 100 includes a first optical system 300A in communication with a second optical system 300B via a fiber feeder 20 that is arranged to convey a feeder signal S1 and S2. The first optical system 300A includes a multiplexer 310, such as a band multiplexer. The multiplexer 310 is configured to multiplex and demultiplex between a first OLT signal S1 ($\lambda_1$-$\lambda_4$, $\lambda_9$-$\lambda_{12}$) from the first OLT 50a (1G-PON), a second OLT signal S2 ($\lambda_5$-$\lambda_8$, $\lambda_{13}$-$\lambda_{12}$) from the second OLT 50b (10G-PON), and the feeder optical signal S3 of the optical feeder 20, which includes both the first and second OLT signals S1, S2. The first OLT signal S1 includes an upstream FSR B1 and a downstream FSR B3, and the second OLT signal also includes an upstream FSR B2 and a downstream FSR B4. Each FSR B1-B4 has wavelengths $\lambda_1$-$\lambda_{16}$, different than the other FSRs B1-B4.

The second optical system 300B may be part of or partially part of the remote node 70. The second optical system 300B is optically connected with the fiber feeder 20.

In addition, the second optical system 300B is configured to multiplex and demultiplex between the feeder optical signal S3 and ONU signals US1-US4, where the ONU signals US1-US4 are outputted/inputted from output 320 of the second optical system 300B. Each output 320 of the second optical system 300B is connected to access fibers 22, 22a-n that connects it to an associated ONU 60. Each ONU signal US1-US4 includes a first upstream wavelength $\lambda_1$-$\lambda_4$ in the first upstream FSR B1, a first downstream wavelength $\lambda_9$-$\lambda_{12}$ in the first downstream FSR B3, a second upstream wavelength $\lambda_5$-$\lambda_8$ in the second upstream FSR B2, and a second downstream wavelength $\lambda_{13}$-$\lambda_{16}$ in the second downstream FSR B4. Therefore, the first ONU signal US1 includes wavelength $\lambda_1$ of FSR B1, wavelength $\lambda_5$ of FSR B2, wavelength $\lambda_9$ of FSR B3, and wavelength $\lambda_{13}$ of FSR B4. The second ONU signal US2 includes wavelength $\lambda_2$ of FSR B1, wavelength $\lambda_6$ of FSR B2, wavelength $\lambda_{10}$ of FSR B3, and wavelength $\lambda_{14}$ of FSR B4. The third ONU signal US3 includes wavelength $\lambda_3$ of FSR B1, wavelength $\lambda_7$ of FSR B2, wavelength $\lambda_{11}$ of FSR B3, and wavelength $\lambda_{15}$ of FSR B4. Finally, the fourth ONU signal US4 includes wavelength $\lambda_4$ of FSR B1, wavelength $\lambda_8$ of FSR B2, wavelength $\lambda_{12}$ of FSR B3, and wavelength $\lambda_{16}$ of FSR B4.

The system 100 may include an optical splitter 400 in communication with each output 320 of the second optical system 300B. The optical splitter 400 further expands the network 100. Each optical splitter 400 conveys the signal US1-US4 outputted from each port 320 of the second optical system 300B to the ONUs 60. For example, the first signal US1 outputted from the first port 320a of the second optical system 300B is split by the power splitter 400, then the signal US1 is conveyed to the ONUs 60 that are optically connected to the splitter 400a. In this case, the first ONU 60a, which is a 1G-PON MAC 60a receives the outputted signal US1 and the second ONU 60b, which is a 10G-PON MAC 60b also receives the same outputted signal US1. In this case, each ONU 60a, 60b includes the band-pass filter 64 that filters the wavelengths that the ONU 60 is designed to receive. The first ONU 60a includes the band-pass filter 64 that allows wavelengths $\lambda_1$ and $\lambda_9$ (from the first OLT signal S1) to pass to the colored diplexer 62 and the second ONU 60b includes the band-pass filter 64 that allows wavelengths $\lambda_5$ and $\lambda_{13}$ (from the second OLT signal S2) pass to the colored diplexer 62. In some cases, the functionality of the band-pass filter 64 maybe a part of the colored diplexer 62, thus the band-pass filter 64 may not be a physical component in the ONU.

Each ONU 60 includes a diplexer 62, which multiplexes first and second ports P1, P2 into a third port P3. The signals on the first and second ports P1, P2 occupy disjoint frequency bands, i.e., are on different FSRs B1-B4; therefore, the signals on the first and second ports P1, P2 can coexist on the third port P3. Therefore, as shown in FIG. 3A, the two shorter wavelength bands FSR B1 and FSR B2 are used for uplink and the two longer wavelength bands FSR B3 and FSR B4 are used for downlink. This relaxes the requirements of the colored diplexer in the ONU 60. Moreover, each ONU 60 includes the band-pass filter 64 before the diplexer 62 to remove unwanted downlink channels from OLTs 50 for other services. The fixed band-pass filter 64 passes frequencies or wavelengths $\lambda$ within a certain range and rejects (i.e., attenuates) frequencies or wavelengths $\lambda$ outside that range. Therefore, each band-pass filter 64 passes the desired wavelengths $\lambda$ associated with the desired service. In some implementations, the diplexer 62 inside each ONU 60 also serves as the band-pass filter 64 before the receiver Rx to remove unwanted downlink channels from OLTs 50 for other services. In some examples, the other wavelength downlink signals for the same service are all removed by the cyclic AWG 200, 200a.

In some implementations, when the cyclical AWG 200 is included in the second optical system 300B to increase the split ratio of a TWDM-PON system, the AWG 200 only allows discrete (or colored) wavelengths to pass to each user 30, which allows the effective stacking of multiple PONs on the same feed fiber 20, 22. FIGS. 3A-3C show 1G-PONs and the 10G-PONs operating over the same fiber plant 20, 22 concurrently, utilizing the four-cycle AWG 200. The cyclical AWG 200 restricts the possible wavelengths that may be overlayed over a fiber plant 20, 22. However, the multiple FSR cycles B1-B4 allow each pair of cycles to serve a different product or network protocol. In some implementations, it is not desirable to use adjacent FSR cycles B1-B4 for uplink and downlink on the same tiered service due to implementation difficulty with colored diplexer 62 at the ONU 60, which is typically implemented using a TFF (thin film filter), see FIGS. 3B and 3C.

1G-PON services at the first OLT 50a use FSR B1 having wavelengths $\lambda_1$-$\lambda_4$ for upstream transmission, and FSR B3 having wavelengths $\lambda_9$-$\lambda_{12}$ for downstream transmission, e.g., while 10G-PON at the second OLT 50b uses FSR B2 having wavelengths $\lambda_5$-$\lambda_8$ for upstream transmission and FSR B4 having wavelengths $\lambda_{13}$-$\lambda_{16}$ for downstream. This spectral allocation allows 1G-PON OLT 50a and 10G-PON OLT 50b to operate on the same fiber plant 20 because, as previously discussed with respect to FIG. 2B, each service uses different FSRs for each of its respective upstream and downstream transmission. The ONUs 60, 60a, 60b receive both services 1G-PON and 10G-PON services from both OLTs 50a, 50b, and each ONU 60, 60a, 60b is configured to select the desirable wavelength (i.e., of the respective service) with the fixed band-pass filter 64 in front of a receiver Rx associated with the ONU 60.

As shown in FIG. 3A, the second optical system 300B includes a cyclical AWG 200 with four output ports 220, 220a-d each outputting a signal US1-US4. The second optical system 300B also includes four outputs 320a-320d. In this case, the output ports 220, 220a-d of the cyclical AWG 200 are aligned with the output ports 320a-320d of the second optical system 300B. Therefore, the first, second, third, and fourth output ports 220, 220a-d of the cyclical AWG 200 are the same as the first, second, third, and fourth output ports of the second optical system 300B. However, as will be discussed below with reference to FIG. 3F, in some implementations, the cyclical AWG 200b includes eight output ports 220a-220h and the second optical system 300B includes optical couplers 340, where each optical coupler 340 combines at least two cyclical AWG output ports 220.

Figure 3D:
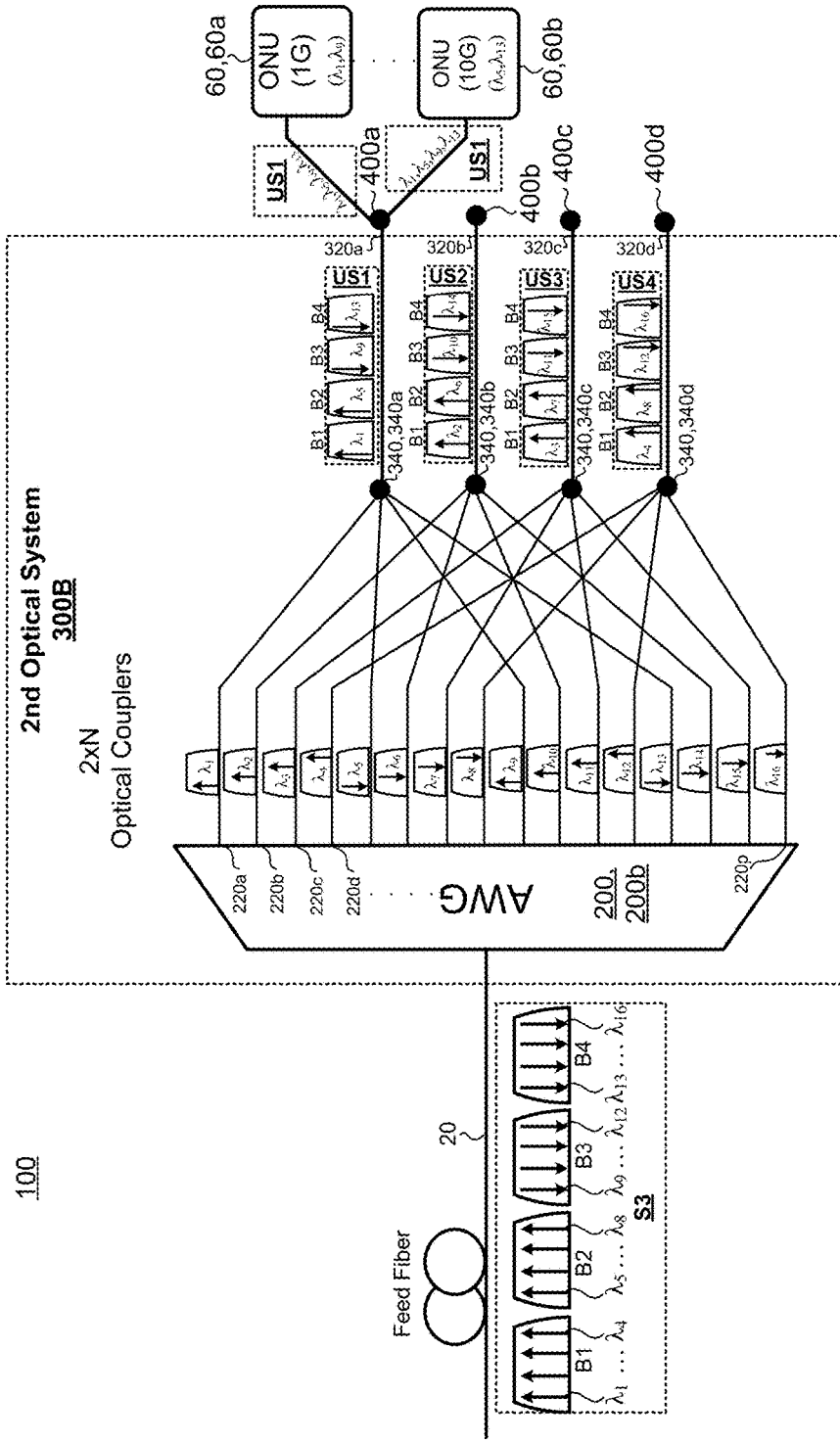
FIG. 3D is a schematic view of an example second optical system of FIG. 3A
Figure 3E:
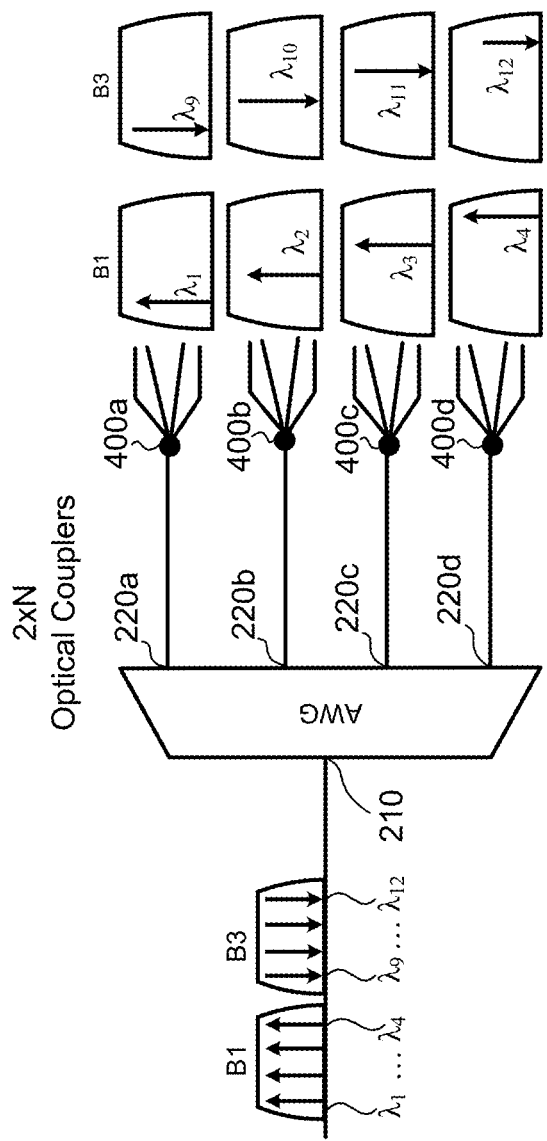
FIGS. 3E and 3F are schematic views of an example AWG in communication with power splitters.
Figure 3F:
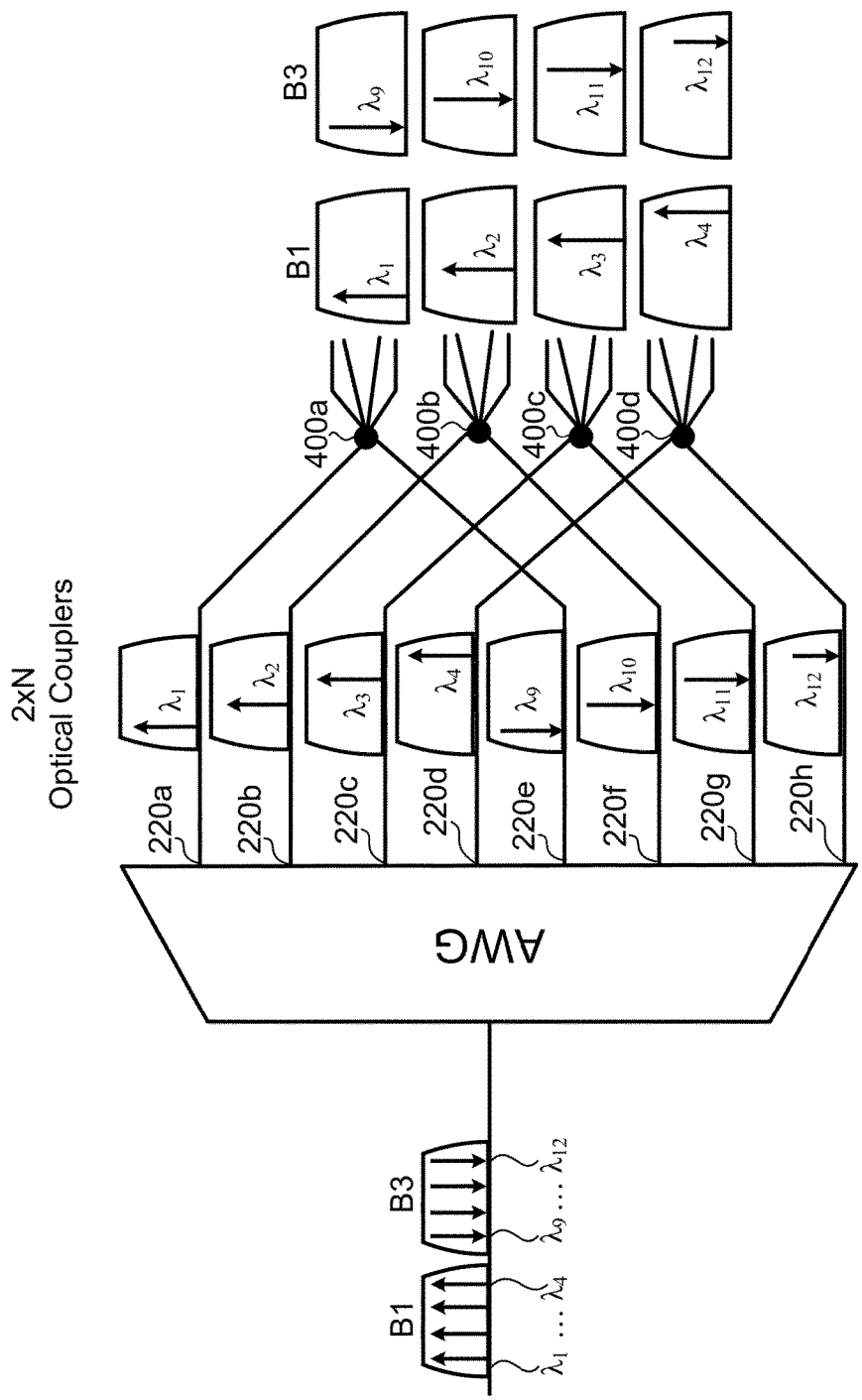

Referring to FIGS. 3D-3F, in some implementations, power splitters, also known as optical couplers 340, 340a-340d, may be co-located with the AWG 200 to increase the splitting ratio and therefore increase the number of users per feeder fiber. AWGs 200 are more expensive than power splitters; so placing the AWG 200 on the OLT 50 side of the power splitter /optical coupler 400 minimizes the number of AWGs 200 within the network 100. FIG. 3E shows a 4-port AWG 200 followed by a 2×N optical coupler 400. As shown, two FSR cycles B1 and B3 are used on the AWG 200.

It is difficult to keep the frequency spacing in the FSR cycles B1-B4 of an AWG 200 identical. FIG. 3D shows a uniform channel spacing on two FSR cycles B1-B4. FIG. 3D is an expansion of the uniform channel spacing on one FSR cycle B1and B3 as shown in FIG. 3F. Referring to FIG. 3F, an AWG 200 with double the number of the channels or outputs 220 may be used. Therefore, to create a N-channel two-cycle device (second optical system 300B shown in FIG. 3D), channel 1 and N+1 are fed into the inputs of a 2×N optical coupler, 2 and N+2 into another coupler and so on. For example, the first output channel 220a of the AWG 200 connects to the first coupler 400a, the second output channel 220b of the AWG 200 connects to the second coupler 400b, the third output channel 220c of the AWG 200 connects to the third coupler 400c, the fourth output channel 220d of the AWG 200 connects to the fourth coupler 400d, the fifth output channel 220e of the AWG 200 connects to the first coupler 400a, the sixth output channel 220f of the AWG 200 connects to the second coupler 400b, the seventh output channel 220g of the AWG 200 connects to the third coupler 400c, and the eight output channel 220h of the AWG 200 connects to the fourth coupler 400d. The first coupler 400a couples the wavelength from the first output channel 220a and the fifth output channel 220e of the AWG 200. The second coupler 400b couples the wavelength from the second output channel 220b and the sixth output channel 220f of the AWG 200. The third coupler 400c couples the wavelength from the third output channel 220c and the seventh output channel 220g of the AWG 200. Finally, the fourth coupler 400d couples the wavelength from the fourth output channel 220d and the eight output channel 220h of the AWG 200. The transfer function from the common port or input 210 of the AWG 200 to the output of the couplers 400 is almost identical to the implementation shown in FIG. 3E, except that the channel spacings will be more uniform across the FSRs.

Fabrication wise, increasing the number of channels/outputs 220 in the AWG 200 increases the area of the AWG 200 and hence the cost. However, it does allow cyclic AWGs to have uniform channel spacings between channels 210 over multiple FSR cycles B1-B4. Additionally, the 'edge effects' of the far channels on each FSR cycle B1-B4, including higher insertion loss, may also be avoided by using a large number of waveguides to create a much larger FSR B1-B4. This allows all channels to be far from any edges. In some implementations, as shown in FIG. 3D, the second optical system 300B implements the design of FIG. 3E, which ties two AWG outputs 220 using two-input couplers 400. Since the design of FIG. 3F may be generalized to multiple coupler ports, to create four FSR B1-B4 cycles for example, outputs 1, N+1, 2N+1, and 3N+1 must be connected to a four-input coupler 340, as in FIG. 3D. The FSR B1-B4 of any wavelength selective device can be reduced by an integer number using this method, including devices that are already cyclic in nature. As shown in FIG. 3D, the second optical system 300B includes an AWG 200b having 16 outputs, and four power couplers 340, 340a-d, each coupler 340 coupling four wavelengths resulting in the same output as shown in FIG. 3A. The system 100 of FIG. 3D may provide for uniform channel spacing between the FSR cycles B1-B4.

Figure 4A:
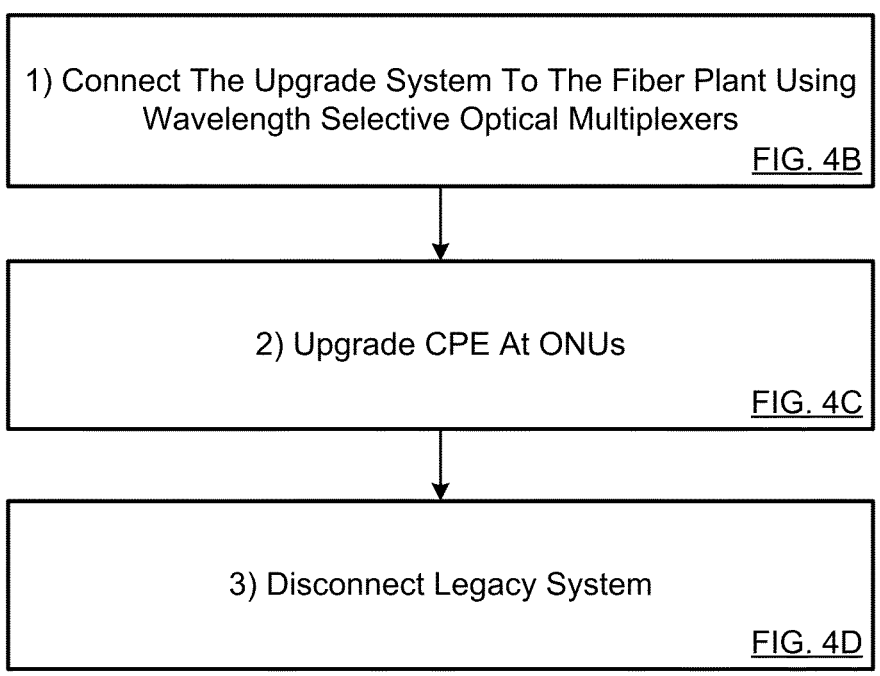
Figure 4D:
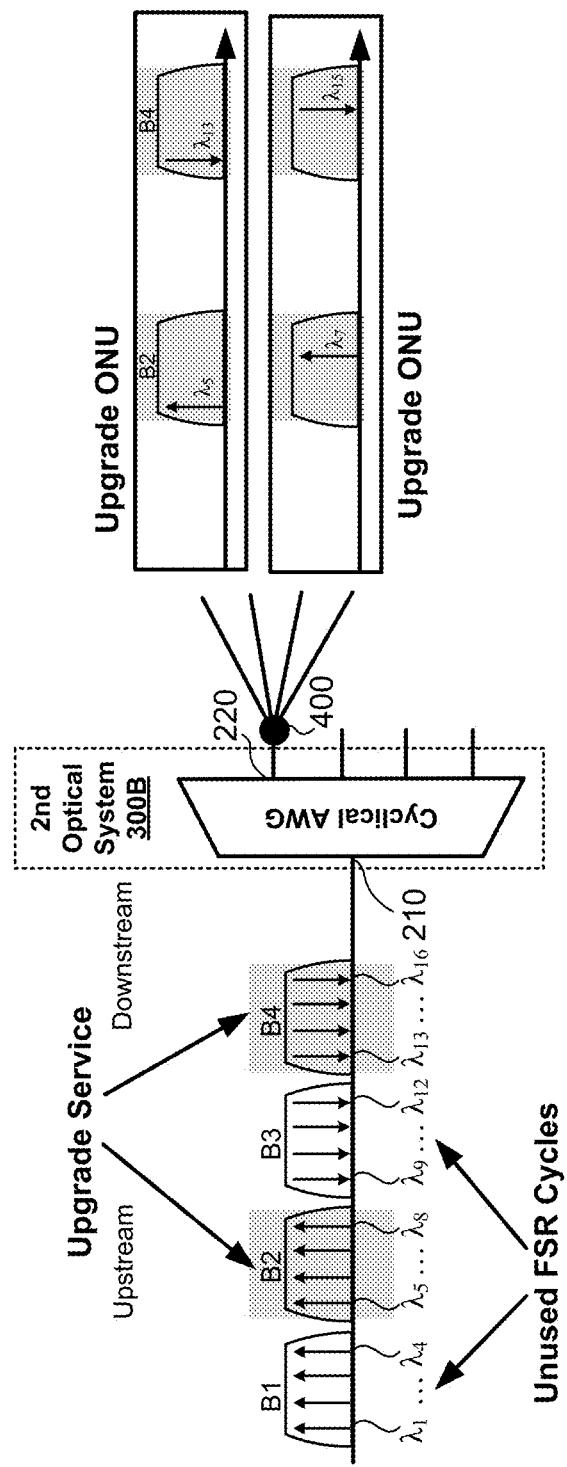

FIGS. 4A-4D show the progress of a network 100 upgrade where the network 100 includes a single tiered service, the legacy service using the FSR B1 for upstream and FSR B3 for downstream. Thus, FSR B2 and FSR B4 are unused as shown in FIG. 4A. To facilitate a seamless system upgrade, the upgrade system/service should operate on the two unused FSRs B2, B4 cycles of the AWG 200. Referring back to FIG. 3A, for example, the first service may be provided by a first OLT 50a while the upgrade may be provided by the second OLT 50b. Therefore, the first step of the system upgrade is to connect the upgraded system (e.g., OLT 50b) to the fiber plant using wavelength selective optical multiplexers (e.g., band multiplexer 310). At this point, the legacy system, OLT 50a, and the upgraded system OLT 50b coexist on the same fiber plant 20, as shown in FIG. 4C. The next step of the upgrade is to start upgrading the ONUs 60 with upgraded CPEs that supports the upgraded services. During this time, each user 30 receives both services as discussed with respect to FIG. 3A. Therefore, when a user upgrades their CPE, the ONU 60 associated with the user 30 receives the upgraded services. The third step of the upgrade occurs when all the users 30 have upgraded their legacy ONUs 60 (supporting OLT 50a) to ONUs 60 that support the upgraded system (e.g., OLT 50b). At this step, the legacy services are disconnected, i.e., disconnect OLT 50a, which frees two FSRs (in this case B1, B3) that the legacy system was using.

The capability of performing a network 100 upgrade (e.g., at the CO 40) seamlessly, without service interruption to the user 30, is highly desirable to an ISP to avoid customer complaints leading to a large number of technical support calls. In cases where the OLT 50 serves only one ONU 60 (e.g., WDM-PON networks), upgrading the services may be easier at the cost of operational complexity, which includes more fibers to be terminated at the OLT 50 side. However, where each OLT 50 provides services to multiple ONUs 60, it is essential for the service provider to prevent late upgraders from losing connectivity altogether. Examples of OLTs 50 that serve multiple ONUs 60 are: (1) optically integrated OLTs 50 that take advantage of photonic and packaging integration to serve multiple wavelengths; (2) systems that also use time division multiplexing (TDM) in addition to WDM to form a TWDM-PON; or (3) a combination of the two.

Figure 5A:
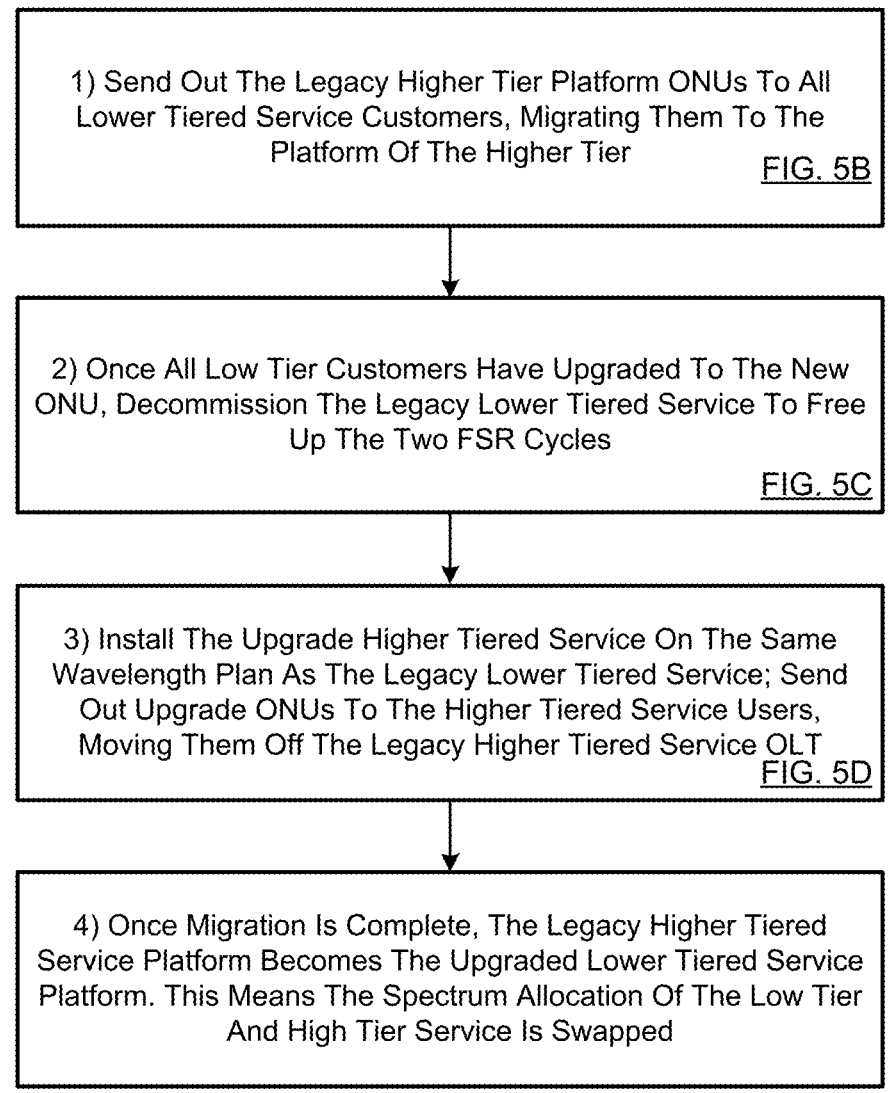
FIGS. 5A-5D are schematic views of example methods and steps of upgrading a legacy network having two services.
Figure 5B:
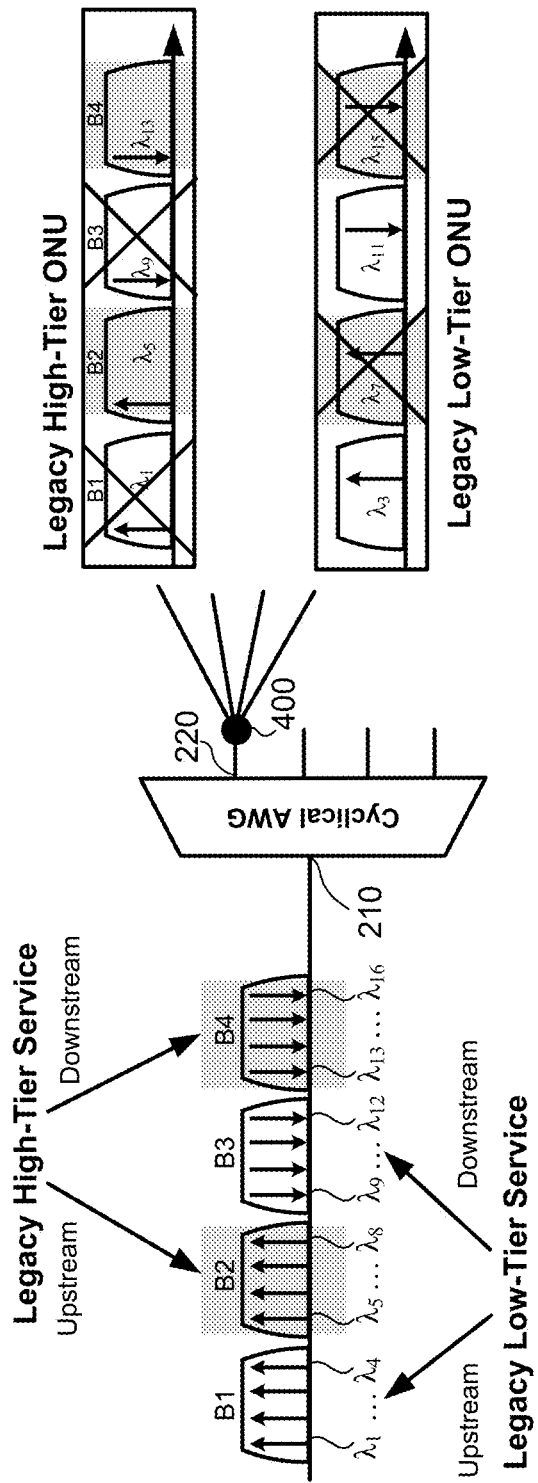
Figure 5C:
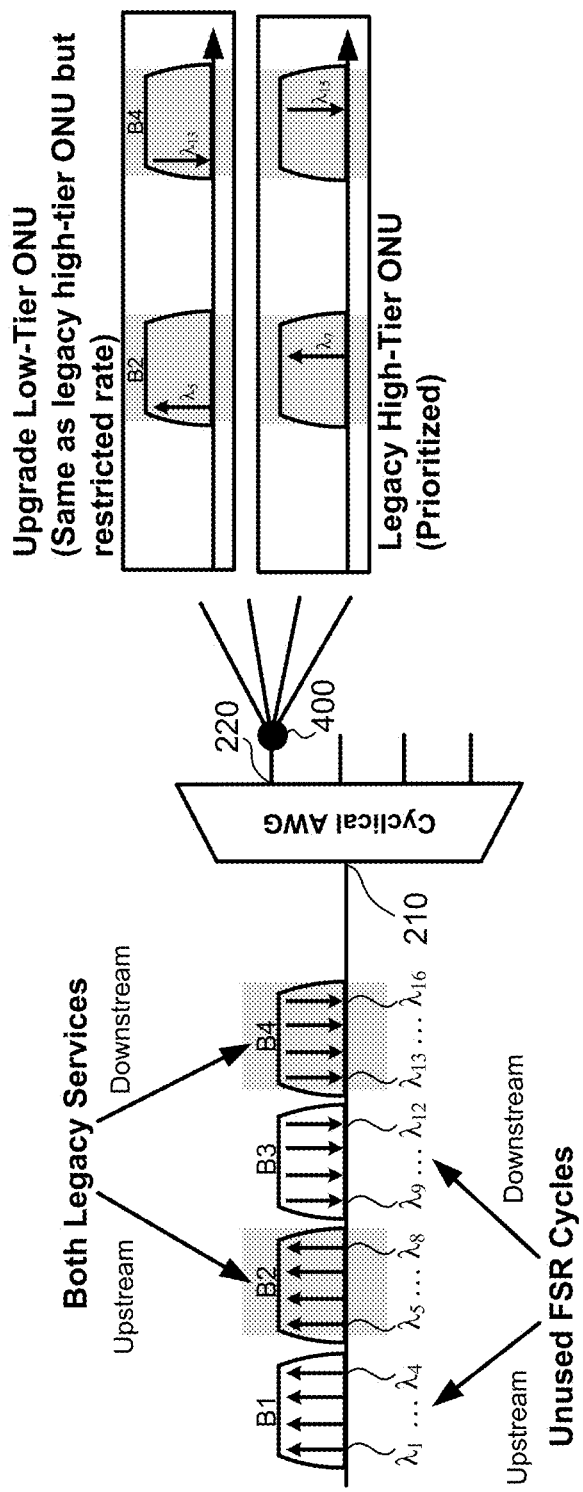
Figure 5D:
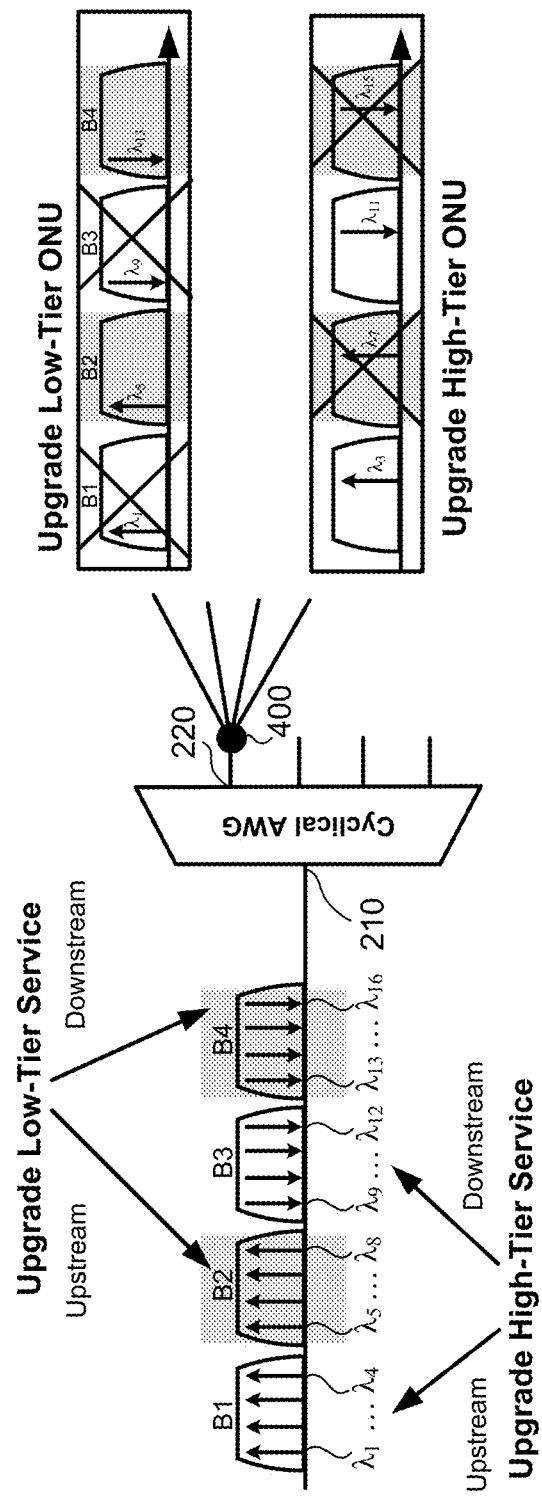

FIGS. 5A-5D show a system 100 upgrade for multiple services. In some implementations, the service provider wants to offer different tiered services over the same fiber feeder 20 concurrently. For example, the service provider may want to offer a 10G-PON service for business customers and a 2.5G-PON service for residential customers. In this case, each PON uses two FSR cycles B1-B4, resulting in a total of four FSR cycles B1-B4, see FIG. 3A and 5B. Using the process described in FIG. 4A-4D, the service provider needs two additional FSR cycles B1-B4 to upgrade either service seamlessly, resulting in a total of six FSR cycles. However, the process described in FIG. 5A-D allows the service provider to upgrade the lower tiered service, and then upgrade the higher tiered service with only the four used FSRs B1-B4. The first step of the upgrade is to send out legacy higher tier platform ONUs 60 to all lower tiered service users 30, which would migrate them to the platform of the higher tier. As previously discussed with respect to FIG. 3A, all users 30 receive the two services that two OLTs provide, and based on the CPE equipment at the ONU 60 (FIGS. 3B and 3C), the service of the user 30 is determined. Therefore, upgrading the CPE at the ONU 60 allows the user 30 to receive the legacy higher-tier services without changes at the OLTs 50. Once the ONUs 60 configured to receive legacy low-tier services are all upgraded to ONUs 60 configured to receive legacy high-tier services, then all the users 30 are served by the legacy high-tier platform. This temporarily reduces the actual capacity of the network 100 by the capacity of the legacy lower-tiered service. In some examples, the service provider configures the CPEs of the previously low-tier customers to limit the traffic allowed to these customers to prevent a dramatic impact of network speed of the legacy high-tier customers. The next step in the upgrade is to decommission the legacy low-tier services by decommissioning or disconnecting the legacy low-tier OLTs 50, which frees up two FSR cycles (e.g., FSR B1 and B3) as shown in FIG. 5C. Following, the service provider installs the upgraded high-tier service on the same wavelength plan (e.g., FSR B1 and B3) as the legacy low-tier service as shown in FIG. 5D. In addition, the service provider provides the legacy high-tier users 30 with upgraded ONUs 60 configured to receive the upgraded legacy high-tier services. Once all the legacy high-tier users 30 upgrade their CPE to support the upgraded high-tier services, the legacy high-tier service platform becomes the upgraded low-tier service platform. As shown in FIG. 5D, the spectrum allocation of the low-tier service and the high-tier service is swapped (i.e., the upgraded low-tier platform uses FSR cycles B2 and B4, while the upgraded high-tier platform uses FSR cycles B1 and B3).

As described, the upgrade processes allow for a reduced upgrade cost since the service provider does not cause any noticeable interruptions to the users 30, thus avoiding service calls. In addition, by using TWDM, the service provider supports a greater number of users 30 with the same number of fibers, thus reducing the number of CO 40 and the amount of feeder fiber required between the CO 40 and the remote node 70, and ultimately saving operational costs.

Figure 6:
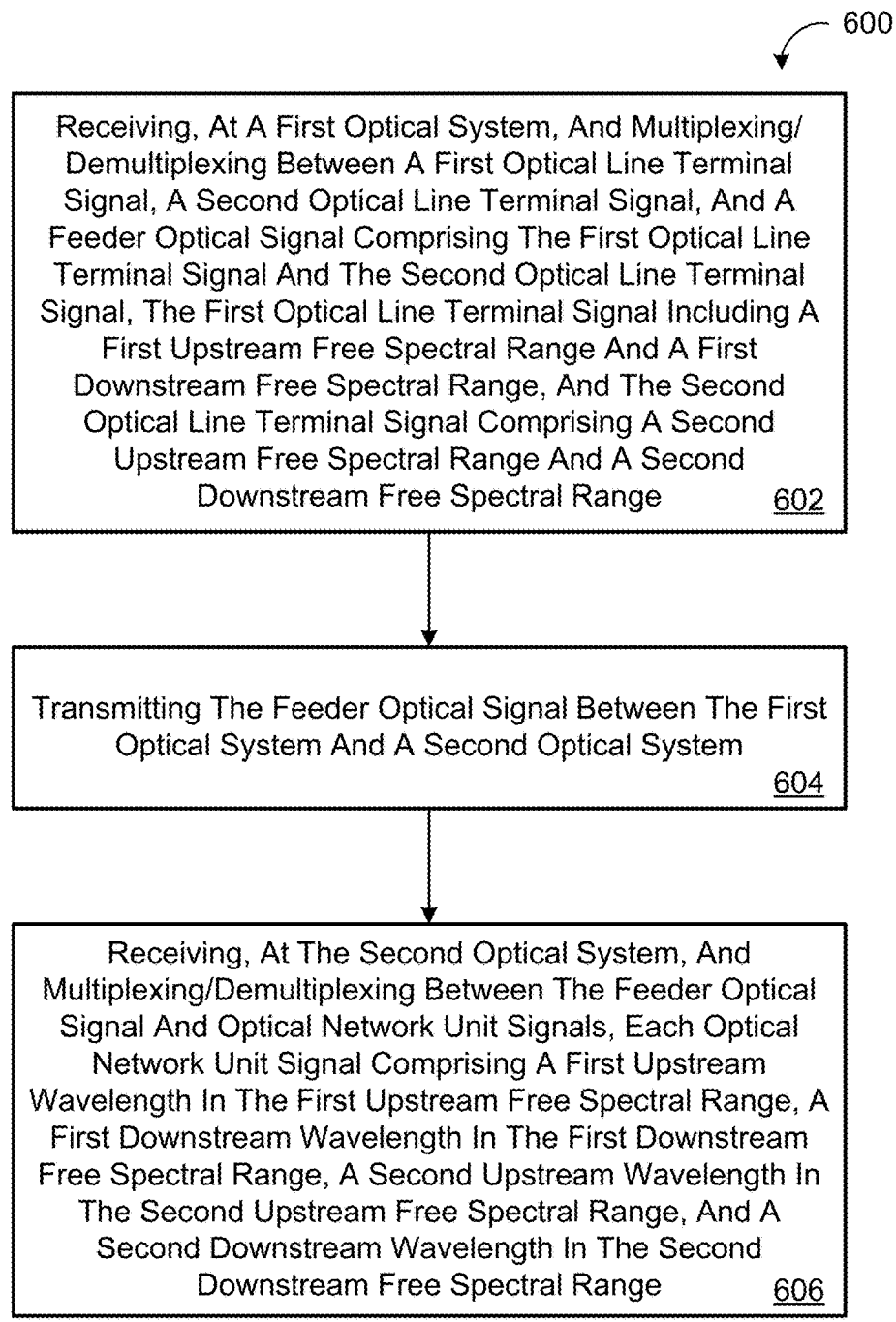
FIGS. 6 and 7 are example arrangements of operations for a method of upgrading a legacy network.

FIG. 6 provides an example arrangement of operations of a method 600 for operating the communication system 100 as discussed in FIGS. 3A-3F. Also referencing FIG. 3A, at block 602, the method 600 includes receiving, at a first optical system 300A and multiplexing/demultiplexing between a first optical line terminal signal S1, a second optical line terminal signal S2, and a feeder optical signal S3 including the first optical line terminal signal S1 and the second optical line terminal signal S2. The first optical line terminal signal S1 includes a first upstream free spectral range B1 and a first downstream free spectral range B3. The second optical line terminal signal S2 includes a second upstream free spectral range B2 and a second downstream free spectral range B4. At block 604, the method 600 includes transmitting the feeder optical signal S3 between the first optical system 300A and a second optical system 300B. At block 606, the method 600 further includes, receiving, at the second optical system 300B, and multiplexing/demultiplexing between the feeder optical signal S3 and optical network unit signals US, US1-USn. Each optical network unit signal US, US1-USn includes a first upstream wavelength $\lambda_1$-$\lambda_4$ in the first upstream free spectral range B1, a first downstream wavelength $\lambda_9$-$\lambda_{12}$ in the first downstream free spectral range B3, a second upstream wavelength $\lambda_5$-$\lambda_8$ in the second upstream free spectral range B2, and a second downstream wavelength $\lambda_{13}$-$\lambda_{16}$ in the second downstream free spectral range B4.

The method 600 may include transmitting at least one of the optical network unit signals US, US1-USn from the second optical system 300B to a first optical network unit 60 and a second optical network unit 60. The first optical network unit 60, 60a may be optically connected with the second optical system 300B and configured to receive an optical network unit signal US, US1-USn having the first upstream wavelength $\lambda_1$-$\lambda_4$ in the first upstream free spectral range B1 and the first downstream wavelength $\lambda_9$-$\lambda_{12}$ in the first downstream free spectral range B3. The second optical network unit 60, 60b may be optically connected with the second optical system 300B and configured to receive an optical network unit signal US, US1-USn having the second upstream wavelength $\lambda_5$-$\lambda_8$ in the second upstream free spectral range B2 and the second downstream wavelength $\lambda_{13}$-$\lambda_{16}$ in the second downstream free spectral range B4.

In some examples, the first optical network unit 60, 60a and the second optical network unit 60, 60b operate using different protocols (e.g., 1G-PON and 10G-PON). The first optical network unit 60, 60a and the second optical network unit 60, 60b may each include a fixed band-pass filter 64. The first upstream free spectral range B1 and the first downstream free spectral range B3 may be associated with a first protocol, and the second upstream free spectral range B2 and the second downstream free spectral range B4 may be associated with a second protocol different from the first protocol. The first optical system 300A may include a multiplexer 310 and the second optical system 300B may include a cyclical arrayed waveguide grating 200. The second optical system 300B may include an arrayed waveguide grating 200 having outputs 220, wherein at least two outputs are optically connected with a coupler 340, 400.

Figure 7:
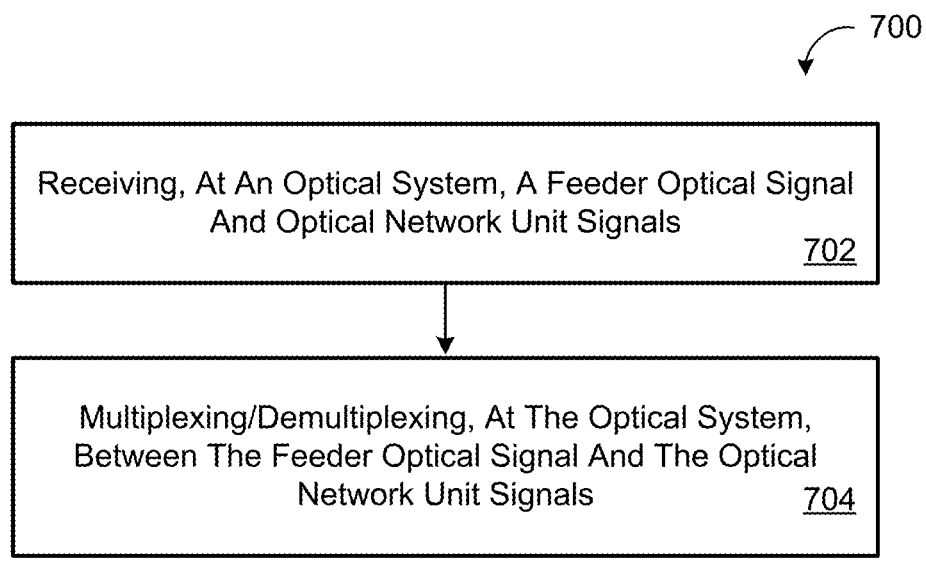

FIG. 7 provides an example arrangement of operations of a method 700 for operating the communication system 100 using an optical system, such as the second optical system 300B as shown in FIGS. 3A, 3D, 3E and 3F. At block 702, the method 700 includes receiving, at the second optical system 300B, a feeder optical signal S3 and optical network unit signals US, US1-USn. At block 704, the method 700 also includes multiplexing/demultiplexing, at the second optical system 300B, between the feeder optical signal S3 and the optical network unit signals US, US1-USn.

In one example, and with additional reference to FIGS. 4A-4D, for a first period of time, the feeder optical signal S3 includes a first optical line terminal signal S1 including a wavelength in a first upstream free spectral range B1 and a wavelength in a first downstream free spectral range B3, and each optical network unit signal US, US1-USn includes a first upstream wavelength $\lambda_1$-$\lambda_4$ in the first upstream free spectral range B1 and a first downstream wavelength $\lambda_9$-$\lambda_{12}$ in the first downstream free spectral range B3.

For a second period of time subsequent to the first period of time, the feeder optical signal S3 includes the first optical line terminal signal S1 and a second optical line terminal signal S2. The second optical line terminal signal S2 includes a second upstream free spectral range B2 and a second downstream free spectral range B4. Each optical network unit signal US, US1-USn includes the first upstream wavelength $\lambda_1$-$\lambda_4$ in the first upstream free spectral range B1, the first downstream wavelength $\lambda_9$-$\lambda_{12}$ in the first downstream free spectral range B3, a second upstream wavelength $\lambda_5$-$\lambda_8$ in the second upstream free spectral range B2, and a second downstream wavelength $\lambda_{13}$-$\lambda_{16}$ in the second downstream free spectral range B4.

In some implementations, the method 700 includes, for the first period of time, transmitting at least one of the optical network unit signals US, US1-USn from the second optical system 300B to a first optical network unit 60, 60a optically connected with the second optical system 300B and configured to receive an optical network unit signal US, US1-USn having the first upstream wavelength $\lambda_1$-$\lambda_4$ in the first upstream free spectral range B1 and the first downstream wavelength in the first downstream free spectral range B3. For the second period of time, the method 700 may include transmitting at least one of the optical network unit signals US, US1-USn from the second optical system 300B to a first optical network unit 60, 60a and a second optical network unit 60, 60b. The first optical network unit 60, 60a may be optically connected with the second optical system 300B and configured to receive an optical network unit signal US, US1-USn having the first upstream wavelength $\lambda_1$-$\lambda_4$ in the first upstream free spectral range B1 and the first downstream wavelength in the first downstream free spectral range B3. The second optical network may be optically connected with the optical system and configured to receive an optical network unit signal having the second upstream wavelength $\lambda_5$-$\lambda_8$ in the second upstream free spectral range B2 and the second downstream wavelength $\lambda_{13}$-$\lambda_{16}$ in the second downstream free spectral range B4. The first optical network unit and the second network unit may operate using different protocols. The first optical network unit 60, 60a and the second optical network unit 60, 60b may each include a fixed band-pass filter 64.

For a third period of time subsequent to the second period of time, the feeder optical signal S3 may include the second optical line terminal signal S2 absent the first optical line terminal signal S1. Each optical network unit signal may include the second upstream wavelength $\lambda_5$-$\lambda_8$ in the second upstream free spectral range B2 and the second downstream wavelength $\lambda_{13}$-$\lambda_{16}$ in the second downstream free spectral range B4, absent the first upstream wavelength $\lambda_1$-$\lambda_4$ in the first upstream free spectral range B1 and the first downstream wavelength $\lambda_5$-$\lambda_8$ in the first downstream free spectral range B3. For the third period of time, the method 700 may include transmitting at least one of the optical network unit signals US, US1-USn from the second optical system 300B to a second optical network unit 60, 60b optically connected with the second optical system 300B and configured to receive an optical network unit signal US, US1-USn having the second upstream wavelength $\lambda_5$-$\lambda_8$ in the second upstream free spectral range B2 and the second downstream wavelength $\lambda_{13}$-$\lambda_{16}$ in the second downstream free spectral range B4.

The first upstream free spectral range B1 and the first downstream free spectral range B3 may be associated with a first protocol, and the second upstream free spectral range B2 and the second downstream free spectral range B4 may be associated with a second protocol different from the first protocol. The second optical system 300B may include a cyclical arrayed waveguide grating 200. The optical system may further include an arrayed waveguide grating 200 having outputs 220, wherein at least two outputs 220 are optically connected with a coupler 340, 400.

In one example, and with additional reference to FIGS. 5A-5D, for a first period of time, the feeder optical signal S3 includes a first optical line terminal signal S1 and a second optical line terminal signal S2. The first optical line terminal signal S1 includes a wavelength in a first upstream free spectral range B1 and a wavelength in a first downstream free spectral range B3. The second optical line terminal signal S2 includes a wavelength in a second upstream free spectral range B2 and a wavelength in a second downstream free spectral range B4. Each optical network unit signal US, US1-USn includes a first upstream wavelength $\lambda_1$-$\lambda_4$ in the first upstream free spectral range B1, a first downstream wavelength $\lambda_9$-$\lambda_{12}$ in the first downstream free spectral range B3, a second upstream wavelength $\lambda_5$-$\lambda_8$ in the second upstream free spectral range B2, and a second downstream wavelength $\lambda_{13}$-$\lambda_{16}$ in the second downstream free spectral range B4. In addition, for a second period of time subsequent to the first period of time, the feeder optical signal S3 includes the second optical line terminal signal S2 absent the first optical line terminal signal S1. Each optical network unit signal US, US1-USn includes the second upstream wavelength $\lambda_5$-$\lambda_8$ in the second upstream free spectral range B2, and a second wavelength $\lambda_{13}$-$\lambda_{16}$ in the second downstream free spectral range B4, absent the m wavelength $\lambda_1$-$\lambda_4$ in the first upstream free spectral range B1 and the first downstream wavelength $\lambda_9$-$\lambda_{12}$ in the first downstream free spectral range B3. In some examples, the method further includes for a third period of time subsequent to the second period of time, the feeder optical signal S3 includes a third optical line terminal signal S1 (different than the first optical line terminal signal, e.g., having different protocols) and the second optical line terminal signal S2. The third optical line terminal signal S1 includes the first upstream free spectral range B1 and the first downstream free spectral range B3. The second optical line terminal signal S2 includes the second upstream free spectral range B2 and the second downstream free spectral range B4. Each optical network unit signal US, US1-USn includes a third upstream wavelength in the first upstream free spectral range B1, a third downstream wavelength in the first downstream free spectral range B3, the second upstream wavelength in the second upstream free spectral range, and the second downstream wavelength in the second downstream free spectral range. The third upstream wavelength may be the same as the first upstream wavelength, and the third downstream wavelength may be the same as the first downstream signal. In some examples, the first upstream spectral range B1 and the first downstream free spectral range B3 are associated with a first protocol for the first period of time and a second protocol for the third period of time. In addition, the wavelengths of the second upstream free spectral range and the second downstream free spectral range are associated with a third protocol for the first, second, and third periods of time. The third protocol is different than the first and/or second protocol.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A communication system comprising:
   a first optical system comprising a multiplexer configured to multiplex and demultiplex between a first optical line terminal (OLT) signal, a second OLT signal, and a feeder optical signal,
   wherein for a first period of time, the feeder optical signal comprises:
      the first OLT signal comprising a wavelength in a first upstream free spectral range (FSR) and a wavelength in a first downstream FSR; and
      an unused portion of spectrum,
   wherein for a second period of time subsequent to the first period of time, the feeder optical signal comprises:
      the first OLT signal; and
      the second OLT signal comprising a wavelength in a second upstream FSR and a wavelength in a second downstream FSR, the second upstream FSR and the second downstream FSR using the unused portion of spectrum;
   an optical feed fiber optically connected with the first optical system and arranged to convey the feeder optical signal; and
   a second optical system optically connected with the optical feed fiber and configured to multiplex and demultiplex between the feeder optical signal and optical network unit (ONU) signals,
   wherein for the first period of time, each ONU signal comprising a first upstream wavelength in the first upstream FSR and a first downstream wavelength in the first downstream FSR,
   wherein for the second period of time, each ONU signal comprising the first upstream wavelength in the first upstream FSR, the first downstream wavelength in the first downstream FSR, a second upstream wavelength in the second upstream FSR, and a second downstream wavelength in the second downstream FSR.

2. The system of claim 1, wherein the second optical system comprises a cyclical arrayed waveguide grating.

3. The system of claim 1, wherein the second optical system comprises an arrayed waveguide grating having outputs optically connected with optical couplers, each coupler combining at least two outputs.

4. The system of claim 1, further comprising:
   a first OLT in communication with the first optical system, the first OLT transmitting/receiving the first OLT signal; and
   a second OLT terminal in communication with the first optical system, the second OLT transmitting/receiving the second OLT signal.

5. The system of claim 1, further comprising:
   a first ONU optically connected with the second optical system and configured to receive an ONU signal having the first upstream wavelength in the first upstream FSR and the first downstream wavelength in the first downstream FSR; and
   a second ONU optically connected with the second optical system and configured to receive the ONU signal, the ONU signal having the second upstream wavelength in the second upstream FSR and the second downstream wavelength in the second downstream FSR.

6. The system of claim 5, further comprising an optical power splitter in communication with the second optical system and the first and second ONUs, the optical power splitter configured to:
   split the ONU signal received from the second optical system for delivery to the first and second ONUs; and
   combine a first upstream signal from the first ONU and second upstream signal from the second ONU for delivery of the optical network signal from the first and second ONUs to the second optical system.

7. The system of claim 5, wherein the first ONU and the second ONU operate using different protocols.

8. The system of claim 5, wherein the first ONU and the second ONU each comprises a fixed bandpass filter.

9. The system of claim 1, wherein the first upstream FSR and the first downstream FSR are associated with a first protocol, and the second upstream FSR and the second downstream FSR are associated with a second protocol different from the first protocol.

10. A method comprising:
    receiving, at a first optical system, and multiplexing/demultiplexing between a first optical line terminal (OLT) signal, a second OLT signal, and a feeder optical signal,
    wherein for a first period of time, the feeder optical signal comprises:
       the first OLT signal comprising a wavelength in a first upstream free spectral range (FSR) and a wavelength in a first downstream FSR; and
       an unused portion of spectrum,
    wherein for a second period of time subsequent to the first period of time, the feeder optical signal comprises:
       the first OLT signal; and
       the second OLT signal comprising a wavelength in a second upstream FSR and a wavelength in a second downstream FSR, the second upstream FSR and the second downstream FSR using the unused portion of spectrum;
    transmitting the feeder optical signal between the first optical system and a second optical system; and receiving, at the second optical system, and multiplexing/demultiplexing between the feeder optical signal and optical network unit (ONU) signals, wherein for the first period of time, each ONU signal comprising a first upstream wavelength in the first upstream FSR and a first downstream wavelength in the first downstream FSR, wherein for the second period of time, each ONU signal comprising the first upstream wavelength in the first upstream FSR, the first downstream wavelength in the first downstream FSR, a second upstream wavelength in the second upstream FSR, and a second downstream wavelength in the second downstream FSR.

11. The method of claim 10, further comprising transmitting at least one of the ONU signals from the second optical system to:

a first ONU optically connected with the second optical system and configured to receive an ONU signal having the first upstream wavelength in the first upstream FSR and the first downstream wavelength in the first downstream FSR; and a second ONU optically connected with the second optical system and configured to receive an ONU signal having the second upstream wavelength in the second upstream FSR and the second downstream wavelength in the second downstream FSR.

12. The method of claim 11, wherein the first ONU and the second ONU operate using different protocols.

13. The method of claim 12, wherein the first ONU and the second ONU each comprises a fixed bandpass filter.

14. The method of claim 10, wherein the first upstream FSR and the first downstream FSR are associated with a first protocol, and the second upstream FSR and the second downstream FSR are associated with a second protocol different from the first protocol.

15. The method of claim 10, wherein the first optical system comprises a multiplexer and the second optical system comprises a cyclical arrayed waveguide grating.

16. The method of claim 10, wherein the second optical system comprises an arrayed waveguide grating having outputs, wherein at least two outputs are optically connected with a coupler.

17. A communication system comprising an optical system receiving a feeder optical signal from an optical feeder optically connected with the optical system, the optical system configured to multiplex and demultiplex between the feeder optical signal and optical network unit (ONU) signals, wherein for a first period of time, the feeder optical signal comprises:

a first optical line terminal (OLT) signal comprising a wavelength in a first upstream free spectral range (FSR) and a wavelength in a first downstream FSR; and an unused portion of spectrum, wherein for the first period of time each ONU signal comprises:

a first upstream wavelength in a first upstream FSR: and a first downstream wavelength in the first downstream FSR, wherein for a second period of time subsequent to the first period of time, the feeder optical signal comprises:

the first OLT signal; and a second OLT signal comprising a wavelength in a second upstream FSR and a wavelength in a second downstream FSR, the second upstream FSR and the second downstream FSR using the unused portion of spectrum, wherein for the second period of time, each ONU signal comprises:

the first upstream wavelength in the first upstream FSR;

the first downstream wavelength in the first downstream FSR;

a second upstream wavelength in the second upstream FSR; and a second downstream wavelength in the second downstream FSR, and wherein the optical system has an optical system input for receiving the feeder optical signal and optical system outputs for outputting the ONU signals.

18. The communication system of claim 17, wherein the optical system comprises an arrayed waveguide grating having arrayed waveguide grating outputs optically connected with optical couplers, each optical coupler combining at least two arrayed waveguide grating outputs, each optical coupler optically connected to one of the optical system outputs.

19. The communication system of claim 18, wherein the optical system comprises a cyclical arrayed waveguide grating.

20. The communication system of claim 17, further comprising:

a first ONU optically connected with the optical system and configured to receive an ONU signal having the first upstream wavelength in the first upstream FSR and the first downstream wavelength in the first downstream FSR; and a second ONU optically connected with the optical system and configured to receive the ONU signal, the ONU signal having the second upstream wavelength in the second upstream FSR and the second downstream wavelength in the second downstream FSR.

21. The communication system of claim 20, further comprising an optical power splitter in communication with one of the outputs of the optical system and the first and second ONUs, the optical power splitter configured to:

split the optical network unit signal received from the optical system for delivery to the first and second ONUs; and combine a first upstream signal from the first ONU and second upstream signal from the second ONU for delivery of the optical network signal from the first and second ONUs to the optical system.

22. The communication system of claim 20, wherein the first ONU and the second ONU operate using different protocols.

23. The communication system of claim 20, wherein the first ONU and the second ONU each comprises a fixed bandpass filter.

24. The communication system of claim 17, wherein the first upstream FSR and the first downstream FSR are associated with a first protocol, and the second upstream FSR and the second downstream FSR are associated with a second protocol different from the first protocol.

* * * * *